US008959787B2

(12) United States Patent
Stephens et al.

(10) Patent No.: US 8,959,787 B2
(45) Date of Patent: Feb. 24, 2015

(54) DEPTH DETERMINATION APPARATUS

(75) Inventors: Peter Davekumar Stephens, Glenhaven (AU); Gary Allan Cook, Glenhaven (AU)

(73) Assignee: Iguana Industrial Solutions Pty Ltd. (AU)

( * ) Notice: Subject to any disclaimer, the term of this patent is extended or adjusted under 35 U.S.C. 154(b) by 211 days.

(21) Appl. No.: 13/503,425

(22) PCT Filed: Oct. 22, 2010

(86) PCT No.: PCT/AU2010/001412
§ 371 (c)(1),
(2), (4) Date: Jul. 11, 2012

(87) PCT Pub. No.: WO2011/047440
PCT Pub. Date: Apr. 28, 2011

(65) Prior Publication Data
US 2012/0266480 A1    Oct. 25, 2012

(30) Foreign Application Priority Data

Oct. 23, 2009  (AU) .............................. 2009905193
Jun. 11, 2010  (AU) .............................. 2010902586

(51) Int. Cl.
*G01B 3/10* (2006.01)
*G01B 3/11* (2006.01)
(Continued)

(52) U.S. Cl.
CPC .. *G01B 3/11* (2013.01); *F42D 1/00* (2013.01); *F42D 3/04* (2013.01); *G01F 23/72* (2013.01)
USPC ............................................ 33/756; 33/1 PT

(58) Field of Classification Search
CPC ........ G01B 5/043; G01B 7/026; G01B 7/042; G01B 21/06; G01B 21/065; G01B 21/18
USPC ........... 33/1 PT, 732, 733, 752, 753, 756, 760
See application file for complete search history.

(56) References Cited

U.S. PATENT DOCUMENTS 4,000,653 A  *  1/1977  Booth et al. ............... 242/390.8
4,140,154 A     2/1979  Kanao
(Continued)

FOREIGN PATENT DOCUMENTS

CN          101025356 A     8/2007
GB          280809          11/1927
(Continued)

OTHER PUBLICATIONS

"International Application No. PCT/AU2010/001412, International Search Report and Written Opinion mailed Jan. 17, 2011", 11 pgs.
(Continued)

*Primary Examiner* — G. Bradley Bennett
(74) *Attorney, Agent, or Firm* — Schwegman Lundberg & Woessner, P.A.

(57) ABSTRACT

A depth determination apparatus is described. The depth determination apparatus includes a rotatable reel for receiving a length of line, a free end of the line being adapted to receive a weight, a hollow elongate leader assembly through which the line is played out and retracted, a measuring arrangement for measuring the length of line played out and/or retracted through the hollow elongate leader; and a drive means for at least retracting the line through the hollow elongate leader.

31 Claims, 10 Drawing Sheets

(51) Int. Cl.
*F42D 1/00* (2006.01)
*F42D 3/04* (2006.01)
*G01F 23/72* (2006.01)

(56) References Cited

U.S. PATENT DOCUMENTS

| | | | |
|---|---|---|---|
| 4,413,808 A | 11/1983 | Finkle | |
| 4,442,405 A | 4/1984 | Andrejasich et al. | |
| 4,468,975 A | 9/1984 | Sayles et al. | |
| 5,236,144 A * | 8/1993 | Kautz | 242/371 |
| 5,503,341 A * | 4/1996 | Kaneko et al. | 33/719 |
| 6,456,201 B1 * | 9/2002 | Mioduszewski et al. | 33/760 |
| 7,263,782 B2 * | 9/2007 | Steinich | 33/732 |
| 2006/0162177 A1 * | 7/2006 | Loy | 33/760 |
| 2009/0009360 A1 * | 1/2009 | Flannigan et al. | 33/733 |
| 2011/0078914 A1 * | 4/2011 | Swanson et al. | 33/756 |

FOREIGN PATENT DOCUMENTS

| | | |
|---|---|---|
| GB | 2154001 A | 8/1985 |
| JP | 58060208 A | 4/1983 |

OTHER PUBLICATIONS

Chinese Application Serial No. 201080047435.1, Office Action mailed Nov. 4, 2014, (w/ English Trans)ation), 22 pgs.
Machine Translation of CN 101025356A, published Aug. 29, 2007, 4 pgs.

* cited by examiner

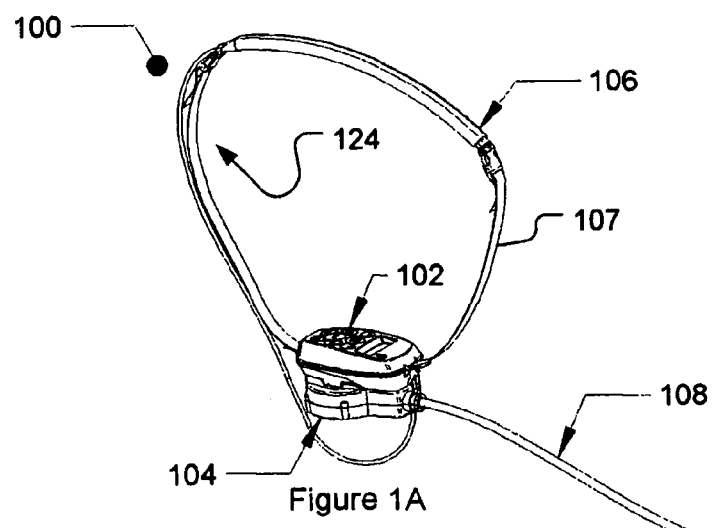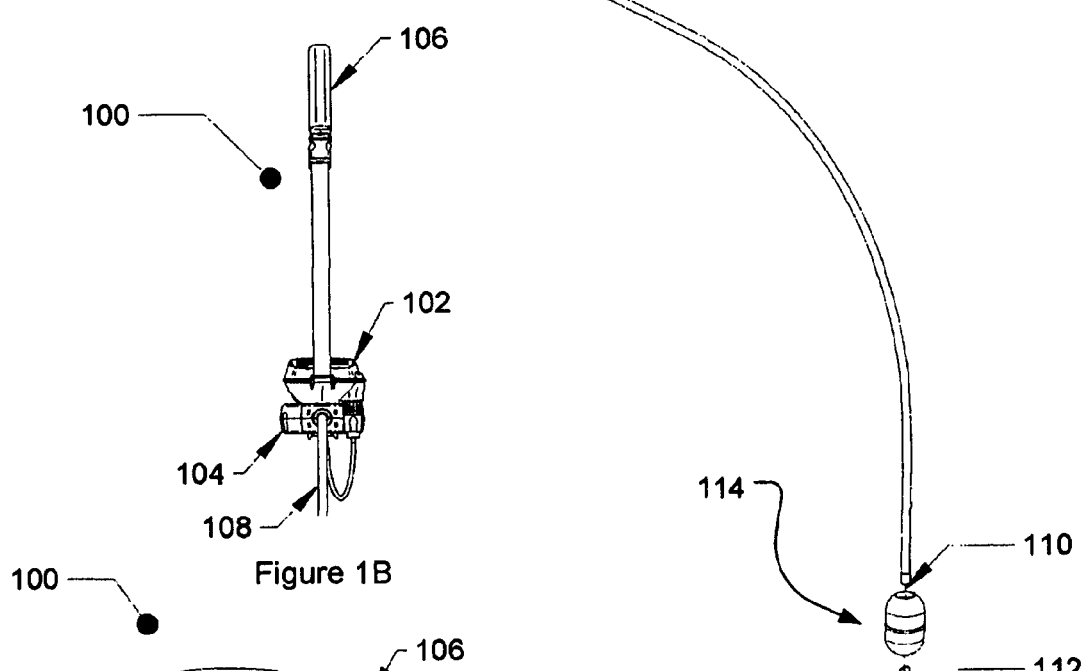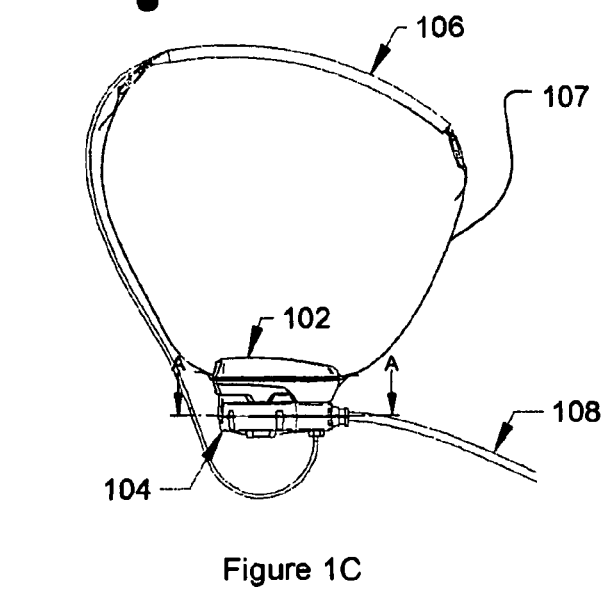

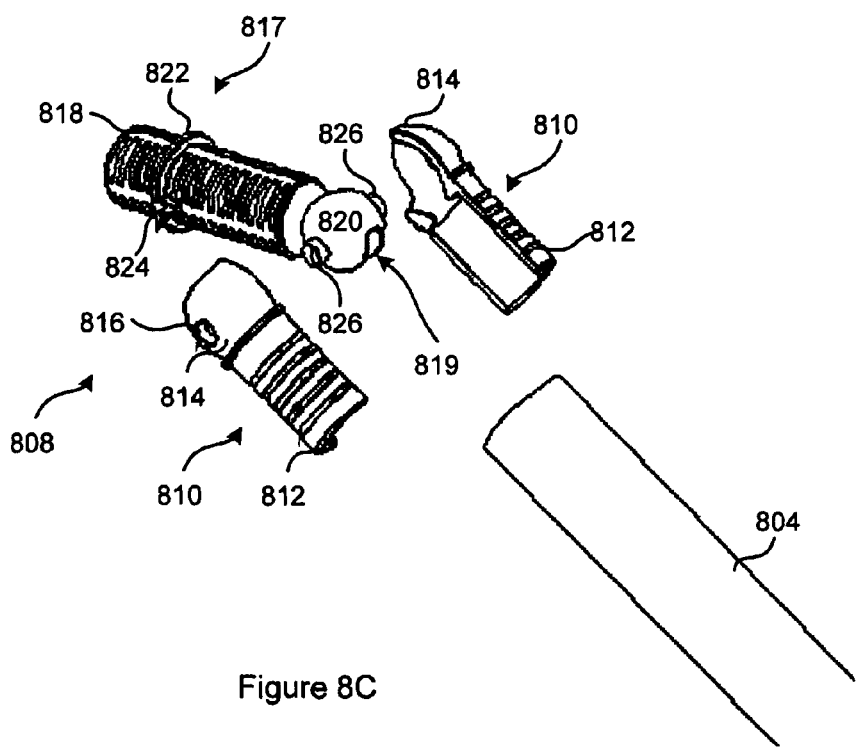
Figure 8C
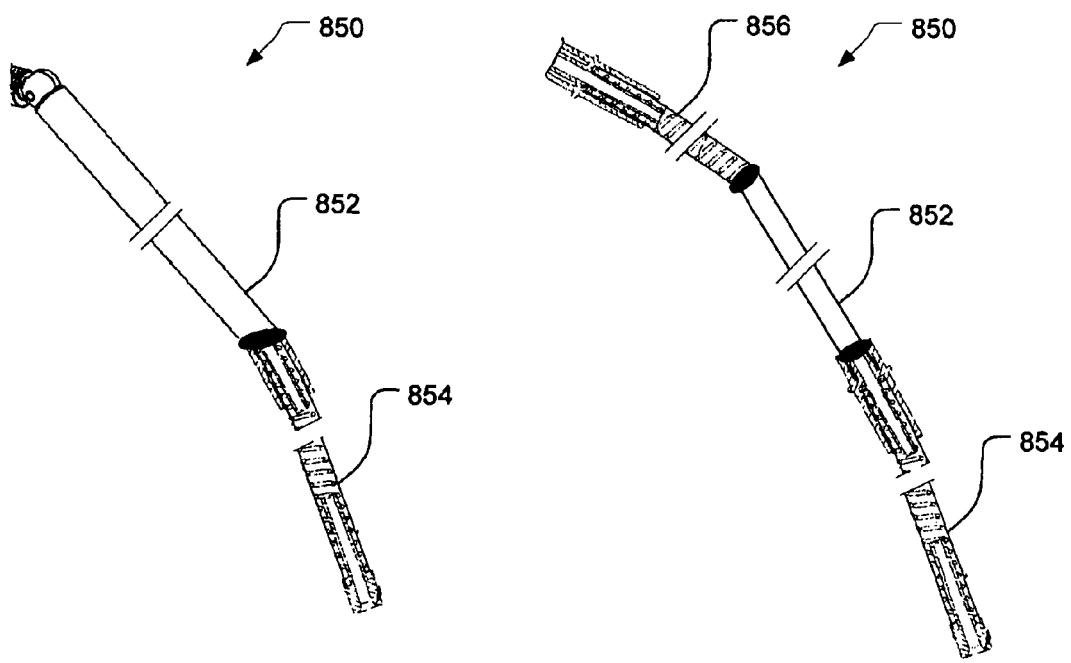
Figure 9A
Figure 9B

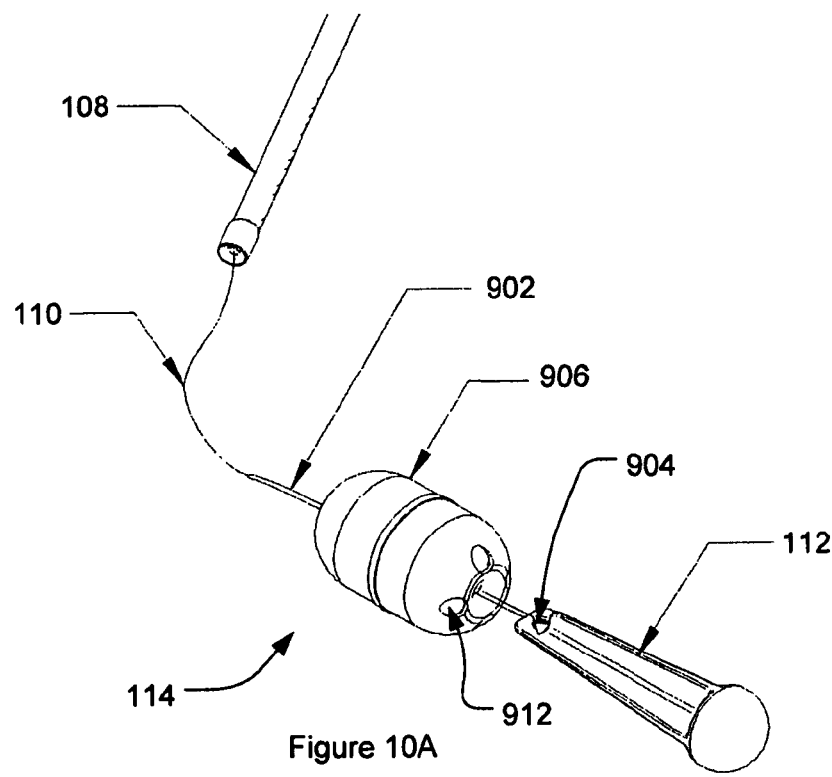
Figure 10A
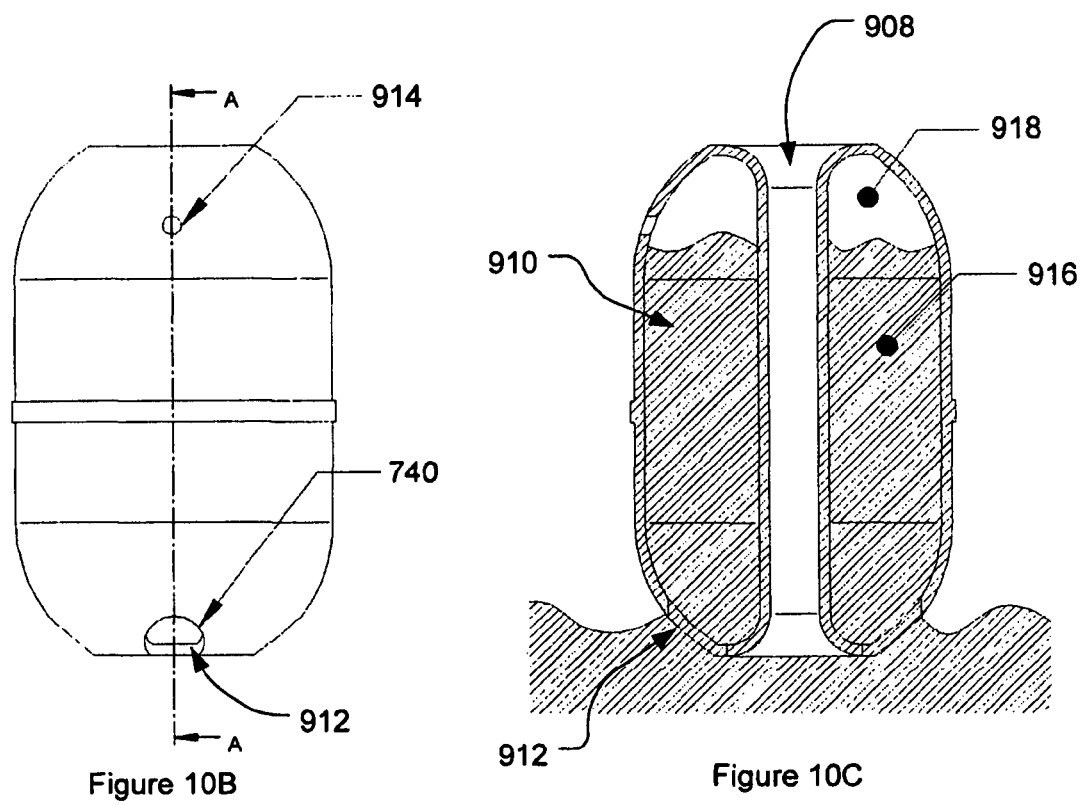
Figure 10B
Figure 10C

DEPTH DETERMINATION APPARATUS

PRIORITY CLAIM TO RELATED APPLICATIONS

This application is a national stage application under 35 U.S.C, §371 of PCT/AU2010/001412, filed Oct. 22, 2010, and published as WO 2011/047440 A1 on Apr. 28, 2011, which claims priority to Australian Application No. 2009905193, filed Oct. 23, 2009, and to Australian Application No. 2010902586, filed Jun. 11, 2010, which applications and publication are incorporated herein by reference and made a part hereof in their entirety, and the benefit of priority of each of which is claimed herein.

FIELD OF THE INVENTION

The present invention relates to apparatus for determining the depth or height of a feature of interest. The apparatus is suitable for use in determining the depth of shafts or drill holes used in blasting operations, however can be used for determining the depth or height of other features.

BACKGROUND OF THE INVENTION

Many operations require the depth or height of a particular feature to be accurately determined. One such operation is blasting that occurs, for example, in a mining or construction context.

In downhole blasting operations drilled holes are filled with a charge or explosives which are then detonated. To ensure a safe and effective blast operation, it is important to be able to measure the depth of the shaft with a relatively high degree of accuracy. The depth of the shaft is required to calculate the amount of explosive required and the likely effects of the blast. In addition, where downhole blasting is being used, for example, to expose a coal seam it is important that holes of a known and correct depth are drilled.

One simple way to measure the depth of such a shaft is to secure a weight to the end of a length of measuring tape and allow the weight to fall into the shaft. The depth of the hole is then read off the tape at the surface. Such a method, however, presents a number of disadvantages. For example, during use the tape rubs against the ground and eventually, after repeated use, the measurement markings are obscured. The tape (a relatively expensive component) must then be discarded. Further, the tape itself can be bulky and difficult to handle especially when relatively deep holes are being measured (~20 m and above).

As an alternative, a weight can be tied to an unmarked line and this can be dropped down the hole. The length of line played out can be measured to determine the depth of the hole. This approach, however, also raises a number of difficulties. For example, the line needs to be protected from the abrasive dust and dirt or else it will degrade and snap very quickly. A reliable way of measuring the line played out must also be available, one that will not be fouled by dirt and that provides an easy way to be operated in the field. Measuring drums are often used with fine gears for manual reading and these rapidly foul and fail. Electronic measures frequently use photo-optic sensors which also have limited tolerance of dust and dirt.

In addition, the phenomenon of 'birds nesting' or line over-run is an issue. This occurs when the weight hits the bottom of the hole but the reel holding the line continues to spin due to it rotary momentum. This causes the line to play out in excess of the requirement since the weight is already stationary at the bottom of the hole. Not only can this result in inaccurate measurement, but also often results in a large tangle of line that can be impossible to untangle.

For many shafts it is not possible to have a user positioned directly over the shaft while taking a measurement. This may be due to the debris extracted from the shaft during drilling being piled up around the edges of the shaft and/or surface instability around the mouth of the shaft. Accordingly, the user will often need to stand a distance from the mouth of the shaft and cast the line in, which can require a relatively high degree of manual coordination. In the action of casting, inaccuracies in the measurement are introduced (due to not knowing the distance from the user to the mouth of the shaft) and potential for knotting or tangling the line is increased.

Some holes can have water or mud at the bottom and it is often important to determine the depth of mud or water at the bottom of the hole in addition to the overall depth of the hole. To do this the operator typically 'bounces' the tape in his or her hand in an effort to feel the transition between the drag of the water or mud and the air. This requires a relatively heavy and large weight in order for the operator to be able to feel a difference between the tape/weight hanging in the air and the tape/weight hanging in water. The stiffness and weight of the tape itself can add to the difficulty in detecting the surface of the water. Although detecting the surface of the water is difficult, it is the established current process in the open cut mining industry. Quite often the water level measurement that is recorded is merely a best guess rather than an accurate measure due to the difficulties described above.

Most, if not all, handling/measurement is done manually and the bulk of the tape means that it is often quite heavy and difficult to handle/manipulate. In some cases, however, the tape may be connected to a winch or similar to allow the tape to be retracted from the hole with ease. This can, however, also lead to problems. During the retraction foreign matter collected by the tape from the shaft and surrounds (dust, clay, mud etc) is pulled into the workings of the winch by the tape, which can in turn lead to operational failure. The bulk of a winch also creates operational difficulties as it accelerates fatigue and can be a trip hazard.

While some of the above problems can, to an extent, be mitigated by an experienced user, the requirement to have such an experienced user to determine the depth of all blast holes itself can be problematic. If only one or two people on the working party have the experience to consistently and accurately determine the depth of the shafts this can cause significant delays in an operation.

More complex automated measurement methods have been trailed. These include the use of lasers and echo location to determine the depth of holes. While not technically impossible, these methods have very specific operational requirements that mean that the user would have to be very skilled and conscientious in the operation of the device. Both lasers and sonar type devices require the beam (optic or sonic) to be very carefully aligned with the axis of the hole and they are very sensitive to outcrops or debris in the hole which may falsely signify the bottom of the hole. As such when a reading is obtained, there is sometimes quite significant uncertainty as to the accuracy of the reading which has to be assessed against other information such as the intended depth of the hole.

Furthermore, both optical and sonic systems have great difficulty in differentiating between mud and water, and as cannot easily determine the true depth of the hole or the depth of mud or water.

It would be desirable to provide an apparatus for measuring depth which overcomes or ameliorates one or more of the above problems. In the alternative, it would be desirable to provide consumers with a useful.

Reference to any prior art in the specification is not, and should not be taken as, an acknowledgment or any form of suggestion that this prior art forms part of the common general knowledge in Australia or any other jurisdiction or that this prior art could reasonably be expected to be ascertained, understood and regarded as relevant by a person skilled in the art.

SUMMARY OF THE INVENTION

In a first aspect the present invention provides a depth determination apparatus including: a rotatable reel for receiving a length of line, a free end of the line being adapted to receive a weight; a hollow elongate leader assembly through which the line is played out and retracted; a measuring arrangement for measuring the length of line played out and/or retracted through the hollow elongate leader; and a drive means for at least retracting the line through the hollow elongate leader.

The depth determination apparatus may further include a main controller, and the measurement means may include a sensor assembly adapted to send a signal representative of the length of line that has been played out and/or retracted to the main controller.

The main controller may be adapted to control the drive means.

The rotatable reel may be housed in a cassette assembly and the hollow elongate leader assembly may be attached to the cassette assembly.

The depth determination apparatus may be powered by a detachable power assembly.

The detachable power assembly may be provided by a battery pack. The battery pack may form part of a strap arrangement for carrying the depth determination apparatus.

In a second aspect the present invention provides a cassette and hollow elongate leader assembly detachably mountable to a drive and control unit, the cassette assembly including: a reel rotatably mounted in the cassette assembly and adapted to receive a length of line, a free end of the line adapted to carry a weight; a drive coupling adapted to detachably couple to a drive assembly of the drive and control unit, the drive assembly for driving the reel to play out and retract the line through the hollow elongate leader.

The cassette and hollow elongate leader assembly may include a measuring arrangement for measuring the length of line played out and/or retracted through the hollow elongate leader. The measuring arrangement may include a sensor assembly adapted to send a signal representative of the length of line that has been played out and/or retracted.

In either or both of the first or second aspects of the invention:

The hollow elongate leader assembly may include at least one hollow flexible section, the hollow flexible section allowing a distal end of the elongate leader assembly to be maneuvered independently of the rotatable reel.

The hollow flexible section of the hollow elongate, leader assembly may include a spring through which the line is played out and retracted.

The spring may be covered by a sleeve.

The at least one hollow flexible section may be substantially the length of the hollow elongate leader assembly.

The hollow elongate leader assembly may further include a hollow rigid section through which the line is played out and retracted, the rigid section being located between at least one of the at least one hollow flexible sections and the rotatable reel. The hollow rigid section may be telescopic or otherwise extendable.

The sensor assembly may include a rotatable encoder wheel mounted such that when the line is played out or retracted the movement of the line causes the encoder wheel to rotate; and wherein the sensor assembly is configured to detect rotation of the encoder wheel.

The encoder wheel may be arranged such that it only rotates when the line is played our or retracted under tension provided by the weight.

The sensor assembly may be configured to count one of individual rotations and part rotations of the encoder wheel.

The encoder wheel may carry a magnet which rotates with the encoder wheel, and the sensor assembly may detect movement of the encoder wheel by detecting changes in the magnetic field.

The drive means may include a drive assembly for rotating the reel to play out and retract the line through the hollow elongate leader assembly.

The drive assembly may be a stepper motor.

The hollow elongate leader assembly may be attached to the cassette assembly at a joint which allows pivotal and/or rotational movement of the hollow elongate leader assembly relative to the cassette assembly. The joint may be a ball joint.

The line may carry a float assembly, the float assembly being movable relative to the line. The float assembly may be adapted to provide audible and/or tactile feedback to allow a water level to be determined. The float assembly may include a hollow body with one or more water inlet holes and one or more breathe holes, the water inlet and breathe holes allowing the hollow body to partially fill with water.

The float assembly may include a float sensor for detecting when the weight is in close proximity to the float assembly and when the weight is separated from the float assembly. The float sensor may be a reed switch that detects the presence of a magnet on the weight. The float assembly may record a timestamp of when the weight is separated from the float assembly and when the weight re-joins the float assembly.

The line and/or float may be provided with a down-hole sensor. The down-hole sensor may be adapted to communicate sensed data. The down-hole sensor may be a temperature sensor and the sensed data may be temperature.

The joint may be configured to allow for pivotal movement of the elongate leader relative to the cassette assembly.

The joint may be further configured restrict the range of pivotal movement of the elongate leader to prevent obstruction of a passageway through the joint through which the line passes.

The distal end of the elongate leader assembly may be provided with a guard through which the line is played out and retracted.

The elongate leader assembly may be removably attachable to the depth determination apparatus.

In a further aspect the present invention, provides a float assembly for use with a depth determination apparatus.

In a further aspect the present invention provides a power assembly for use with a depth determination apparatus.

In a further aspect the present invention provides a sensor assembly for use with a depth determination apparatus.

BRIEF DESCRIPTION OF THE DRAWINGS

Preferred embodiments of the invention will now be described with reference to the accompanying Figures in which:

FIG. 1A shows a perspective view of a depth determination apparatus in accordance with an embodiment of the invention;

FIG. 1B shows a partial front elevation view of the apparatus depicted in FIG. 1A;

FIG. 1C shows a partial side elevation view of the apparatus depicted in FIG. 1A;

FIG. 8C shows an exploded perspective view of the leader assembly of FIG. 8A;

FIGS. 9A and 9B show perspective views of a further alternative leader assembly suitable for use with the depth determination apparatus of FIG. 1;

FIG. 10A shows a perspective view of a float assembly suitable for use with the depth determination apparatus of FIG. 1;

FIG. 10B shows an elevation view of the float assembly of FIG. 10A; and

FIG. 10C shows a sectional elevation view of the float assembly of FIG. 10A taken along line A-A of FIG. 10B.

DETAILED DESCRIPTION OF THE EMBODIMENTS

Figure 2:
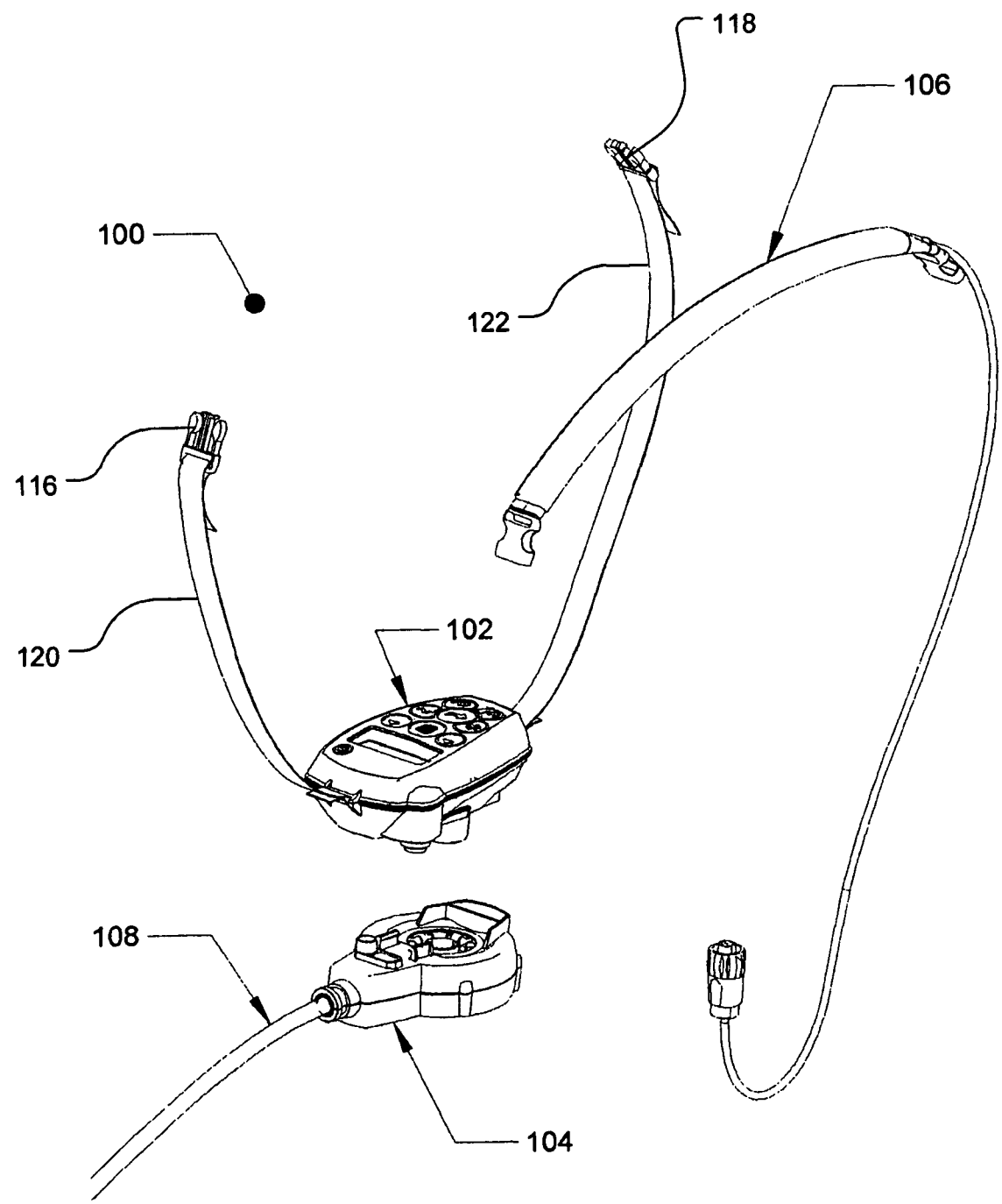
FIG. 2 shows a perspective view of the components of the apparatus depicted in FIG. 1 in a disassembled configuration.

The present invention relates to a depth determination apparatus which may be used in a variety of applications. One particular, though non-limiting, application, is use of the apparatus to measure the depth of holes or shafts used in drilling and blasting operations, and this specific application will be used to describe the use of the apparatus. The apparatus could, however, be used in many other operations and to measure the depth/height of many other features. By way of non-limiting examples, the invention could be used to measure the height/depth of shafts, holes, pits, fissures, caves, crevasses, chasms, buildings, escarpments, waterfalls, etc. The invention may also be used in aquatic environments, for example to determine the depth of sea or river beds where relatively precise readings are required.

FIGS. 1A, 1B and 1C respectively provide a perspective, front elevation and side elevation view of a depth determination apparatus 100 in accordance with an embodiment of the invention. The depth determination apparatus 100 includes a main body assembly 102, a cassette assembly 104, a power supply assembly 106 (carried by a shoulder strap 107), and a leader assembly 108.

As can be seen in FIG. 2, in the present embodiment of the invention the main body assembly 102, cassette assembly 104, and power assembly 106 are interconnecting assemblies which may be assembled and disassembled by an end user. In some embodiments, the cassette assembly 104 and leader assembly 108 may also provided so as to be assembled/disassembled by an end user.

By way of very general overview, in use the leader 108 of the depth determination apparatus 100 is placed over the edge of the feature (e.g. a shaft) being measured. The depth determination apparatus 100 is then operated to play out line 110 (the line 110 having a weight 112 fixed thereto) through the leader 108 until the weighted line 110 comes to rest at the bottom of the shaft. When the weight 112 reaches the bottom of the shaft the depth determination apparatus 100 operates to actively brake the line 110 (or, more specifically, the reel 424 around which the line 110 is wound), thereby reducing the likelihood of birds nesting/line overrun. The depth determination apparatus 100 is then operated to retract the line 110.

In the present embodiment, and as illustrated, the apparatus 100 also includes a float assembly 114 through which the line 110 also passes. If there is water/mud at the base of the feature being measured (e.g. in the bottom of the shaft), the float assembly 114 allows for the depth at which the water exists to be measured, as well as the absolute depth of the shaft (i.e. the bottom of the water/mud).

The depth determination apparatus 100 calculates the length of line 110 that has been played out (either during playing the line out or during retraction), displays the calculated length to the user, and stores the calculated length in a memory of the depth determination apparatus 100 (and/or transmits the calculated length to an external device).

Figure 3A:
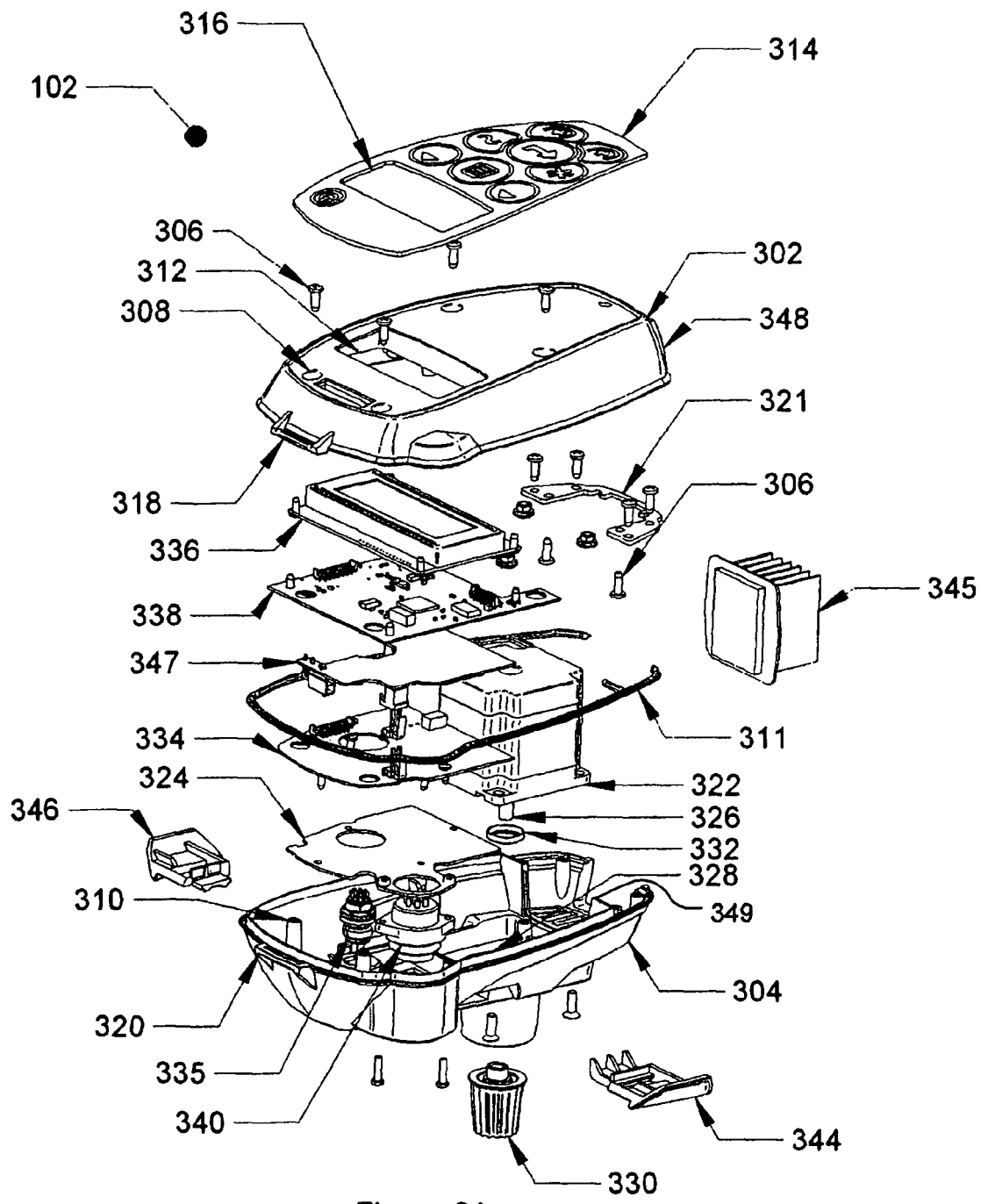
FIG. 3A shows an exploded perspective view of the main body assembly of the apparatus depicted in FIG. 1.
Figure 3B:
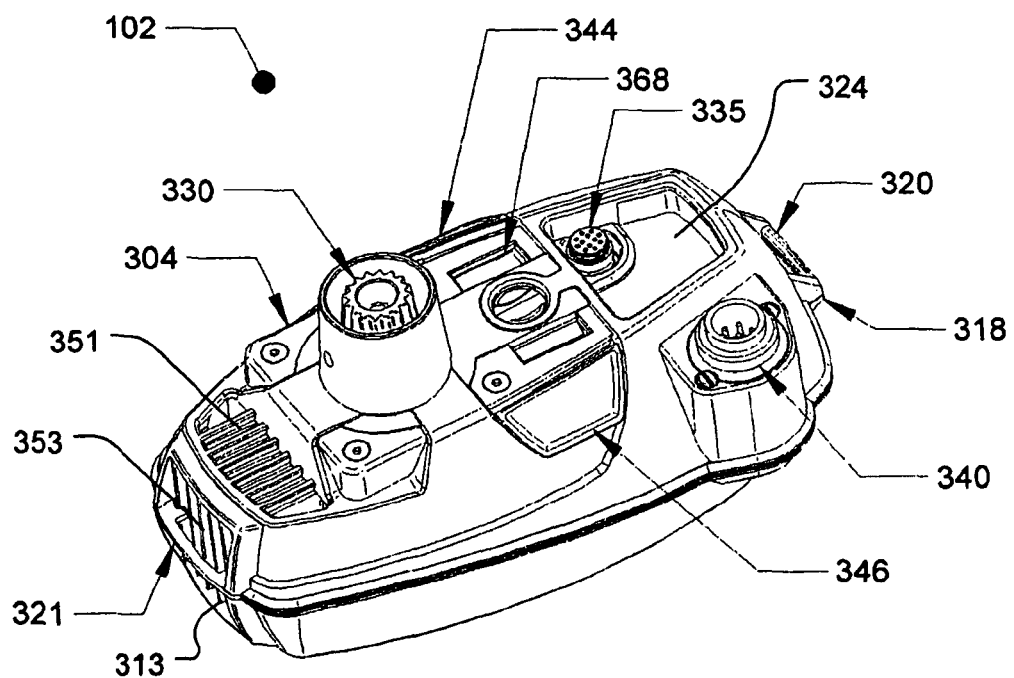
FIG. 3B shows perspective view of the underside of the main body assembly of FIG. 3A.
Figure 3C:
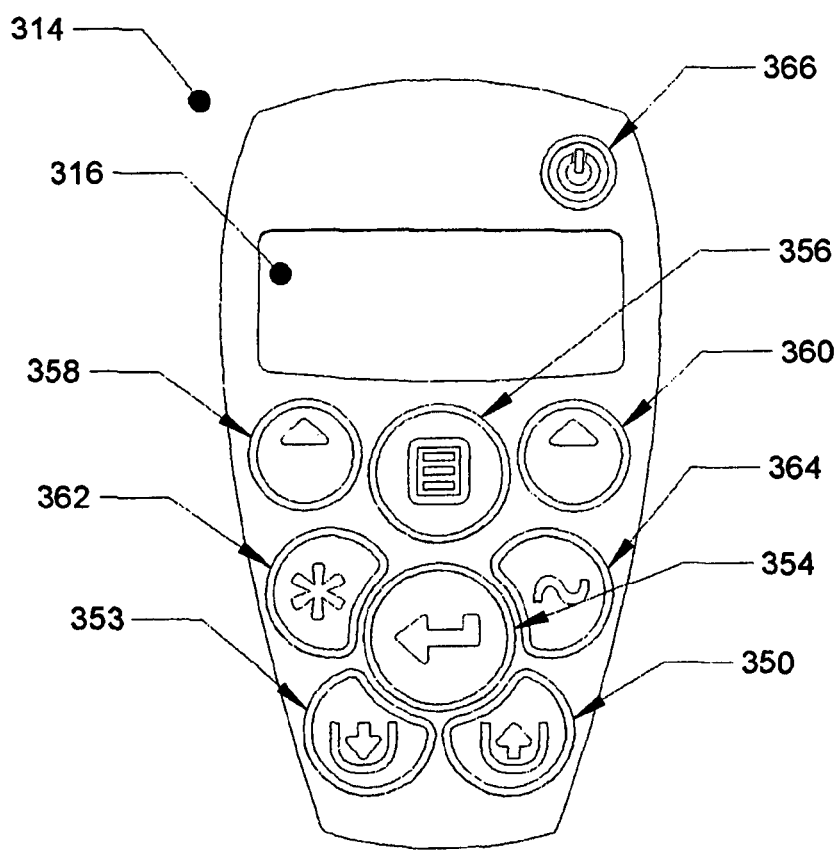
FIG. 3C shows a plan view of a decal for use with the main body assembly of FIG. 1.

Turning to FIGS. 3A to 3C, the main body assembly 102 will be described in detail. The main body assembly includes an upper main housing 302 and a lower main housing 304. The housings 302 and 304 are injection moulded from a durable and sturdy plastic material such as a polycarbonate or polycarbonate blend material. The upper and lower main housings 302 and 304 may be secured together via screws 306 which pass through apertures 308 in the upper main housing 302 and into complementarily placed bores 310 formed in the lower main housing 304. The main body assembly 102 also includes a rubber seal 311 which is compressed between the upper and lower main housings 302 and 304 when secured together in order to assist in keeping dust and other foreign matter out of the main body assembly 102.

The upper main housing 302 includes a cutout 312 through which a display (discussed below) may be viewed, and a grill 313 allowing airflow into a rear cavity of the main body assembly 102. The upper main housing 302 also includes a face plate in the form of a decal 314. Decal 314 is described further below, however includes a transparent window 316 positioned to align with the cutout 312 and a number of user-operable buttons. The decal 314 covers screws 306 and may be provided with any desired detail, such as a trade mark or logo, operational information/instructions etc. The decal 314 may snap-fit into place on the upper main housing 302, or if desired may be secured in place by other fastening/adhesive means.

The upper main housing 302 is provided with a front attachment point 318 which, when the main body 102 is assembled, aligns with attachment point 320 on the lower main housing 304. The main body assembly 102 also includes a plate 321 (in this instance made from stainless steel) which is secured between the upper and lower main housings 302 and 304, a portion of the plate 321 extending beyond the periphery of the upper and lower main housings 302 and 304. A strap or similar can be attached to the main body assembly 102 by the front attachment points 318 and 320 and the plate 321.

Between the upper and lower main housings 302 and 304 the main body assembly 102 also houses a drive assembly which, in this particular embodiment, is a stepper motor 322. The stepper motor 322 is mounted to the lower main housing 304 (via screws locating in suitably placed bores). The stepper motor 322 includes a shaft 326 which, when the body 102 is assembled, passes through a shaft aperture 328 in the lower main housing 304 and is secured to a drive spline 330. A lip seal 332 is provided to seal the shaft aperture 328.

The main body assembly 102 also houses a main body controller 338. The main body controller 338 is, in this instance, a printed circuit board (PCB) with a micro controller which accesses a memory, and is connected to and controls the stepper motor 322 and the display 336. In this instance the display 336 is an LCD screen and is controlled by the main body controller 338. The stepper motor is controlled by the main body controller 338 via a stepper motor driver board 334. The stepper motor driver board 334 receives power boosted to the optimum voltage level by a power control board 347. The power control board 347 also supplies power to the main body controller 338. The main body controller 338 also controls the functional aspects of the depth determination apparatus 100, such as monitoring the length of line 110, displaying data on the display 336, receiving user input from the user interface (i.e. the buttons on the decal 314 as described below), and for communicating with external devices (either by wired or wireless means). A suitable microcontroller for use with the main body controller 338 is an ARM Cortex chip.

A cassette connector 335 is also provided which provides for electrical connection between the main body assembly 102 and the cassette, assembly 104 (and, in particular, the main body controller 338 and the cassette controller 422).

Also included in the main body assembly 102 is a heatsink 345 which may, for example, be an aluminium heatsink. Heatsink 345 is accommodated by plate 321, and slots into shoulders 349 formed in the lower main housing 304. This provides for an effective seal between a rear cavity of the main body assembly (open to air via grills 351 and 353 in the lower main housing 304 and grill 313 in the upper main housing 302) and the main cavity of the main body assembly 102 which houses the other componentry of the main body assembly 102. The main body assembly 102 also includes a motor driver board 334 which is mounted to the lower main housing 304 via and in contact with a heat sink plate 324.

Airflow generated by the rotation of the reel 424 in the cassette assembly 104 (discussed below) travels across the bottom/back of the main body assembly 102 and across the motor heat sink 345 (passing through grills 351, 353 and 313) and carrying heat away from the motor. This airflow takes place across the external surfaces of the main body assembly 102 and through the rear of the main body assembly 102, the central cavity of the main body assembly 102 remaining sealed and substantially airtight.

Turning to FIG. 3C, the decal 314 will be described. As can be seen, the decal 314 includes a number of buttons which allow a user to interact with the depth determination apparatus 100. In the present embodiment the decal 314 provides nine buttons:

An up button 350, which when operated retracts the line;

A down button 352, which when operated feeds the line out;

An enter button 354 which has a context sensitive functionality dependant on the mode of operation. For example, the $1^{st}$ time the enter button 354 is operated after turning the depth determination apparatus 100 on it is programmed to zero the depth determination apparatus 100. The next time the enter button 354 is operated the apparatus 100 will take a depth measurement. The operation of the enter button 354 can be changed by selecting a different operation from the other menu buttons;

A menu button 356 which allows navigation of options such as configuring Bluetooth communications;

A left function button 358 which is a software definable special function button that may be used as a shortcut button. For example, the left function button may be configured to transmit a depth reading;

A right function button 360, which may be a configurable shortcut button as per the left function button 358;

A first special function button 362. This may, for example, be used to navigate through menu items going up;

A second special function button 364. This may, for example, be used to navigate through menu items going down; and A power button 366 for switching the depth determination apparatus 100 on and off.

The lower main housing 304 accommodates two release buttons 344 and 346 which, when the main body assembly 102 is assembled and attached to a cassette assembly 104, are operable by a user to disconnect the cassette assembly 104 from the main body assembly 102. Release buttons 344 and 346 are spring mounted in the main body assembly 102 and each includes an aperture 368 for engaging with corresponding catches 410 on the cassette assembly 104.

The depth determination apparatus 100 is powered by a power supply (discussed below) which connects to the main body controller 338 via a power supply connector 340. As shown in FIG. 3B, when the main body assembly 102 is assembled the power supply connector 340 is accessible through the lower main housing 304 to allow connection to the power supply.

Figure 4A:
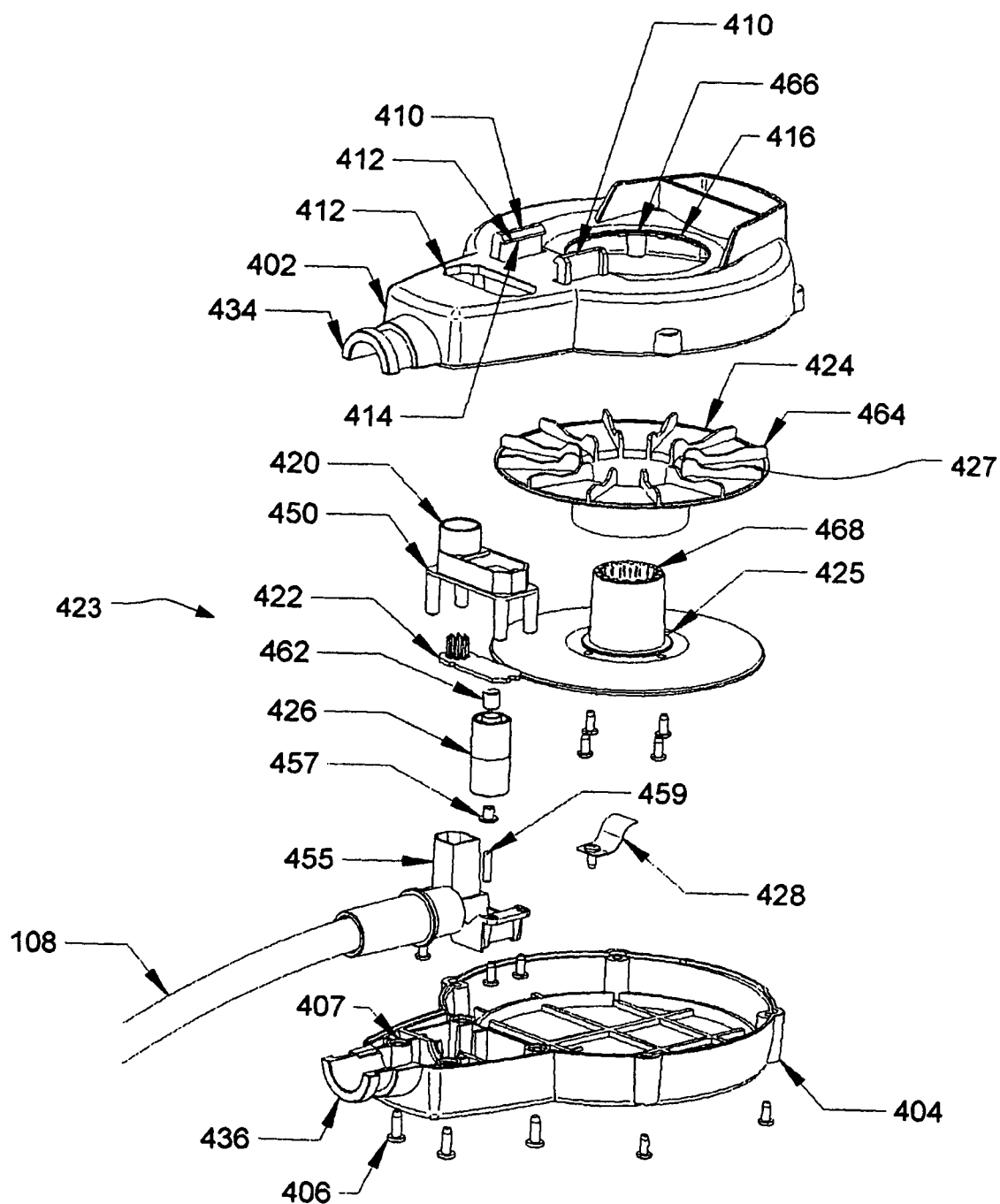
FIG. 4A shows an exploded perspective view of the cassette assembly of the apparatus depicted in FIG. 1.
Figure 4B:
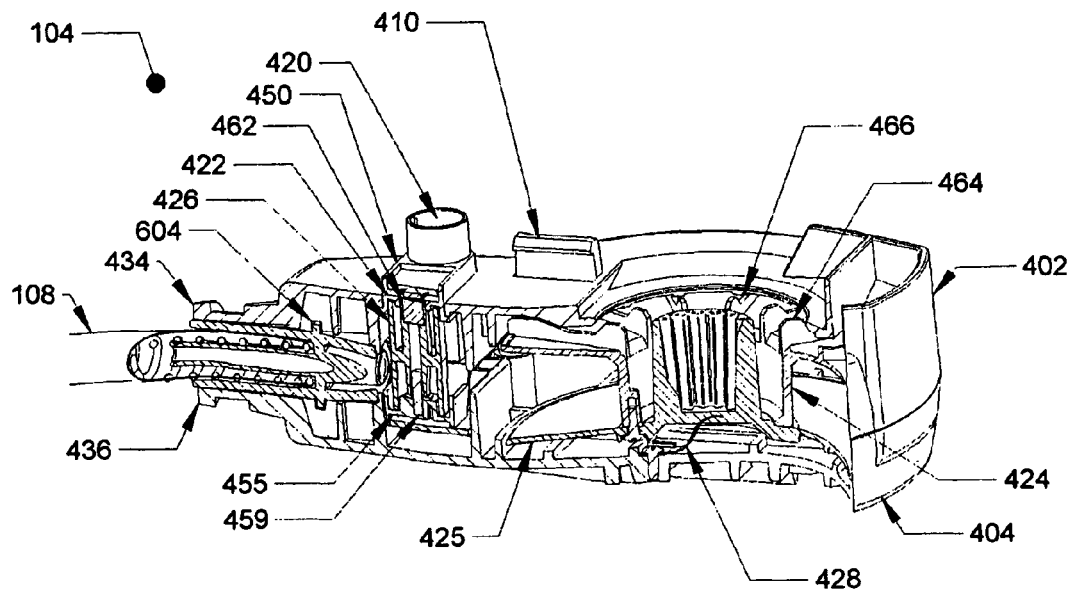
FIG. 4B shows a sectional view of the cassette assembly of the apparatus depicted in FIG. 1.

Turning to FIGS. 4A and 4B, the cassette assembly 104 of the depth determination apparatus 100 will be described. The cassette assembly 104 includes an upper cassette housing 402 and a lower cassette housing 404 which, in this instance, are also injection moulded from a sturdy plastics material such as a polycarbonate/polycarbonate blend. When assembled, the upper cassette housing 402 is screwed into the lower cassette housing 404 by a number of screws 406 which pass through apertures 407 in the lower cassette housing 404 (some of which obscured) and locate in complementarily placed bores (obscured) in the upper cassette housing 402.

The upper cassette housing 402 includes a pair of catches 410 which are provided with an inclined surface 412 and shoulder 414. The catches 410 are shaped to engage with release buttons 344 and 346 in the lower main housing 304. The catches 410 and release buttons 344 and 346 allow the upper cassette housing 402 (and hence, when assembled, the cassette assembly 104) to be removably attached to the main body assembly 102.

Between the upper and lower cassette housings 402 and 404 the cassette assembly 104 houses a cassette assembly controller 422 (which, when the depth determination apparatus 100 is assembled, connects to the main body controller 338 through the cassette control communication aperture 420), a reel 424, and a sensor assembly 423 (in this case an encoder wheel assembly).

The cassette reel 424 is made up of an upper reel piece 464 and a lower reel piece 425 which are secured together by screws which pass through apertures in the lower reel piece 425 and screw into complementary bores (mostly obscured) in the upper reel piece 464. When assembled, the reel 424 sits on a leaf spring 428 which is screwed to the lower cassette housing 404. When the cassette housing 104 is secured to the main housing 102 the spline 330 (which, as will be recalled, is secured to the shaft 326 of the stepper motor 322) intermeshes with teeth 468 provided inside the spindle 425 of the lower half of the reel 468, allowing the stepper motor 322 to control rotation of the reel 424.

In the present embodiment (and when the cassette assembly 104 is mounted to the main body assembly 102) the main body assembly drive spline 330 engages with the cassette reel teeth 468 and drives the reel 424 directly. This direct drive mechanism is relatively efficient and quiet, and in some instances less prone to fouling and damage than a geared drive system. If desired, however, the connection between the drive spline 330 and the cassette reel 468 could be geared.

The upper side of the upper reel piece 464 is formed with ribs 427 which serve both to increase airflow on rotation of the reel 424 and to prevent rotation of the reel 424 when the cassette assembly 104 is disengaged from the main body assembly 102.

When the cassette assembly 104 is engaged with the main body assembly 102, the drive spline 330 engages with the teeth 468 of the reel 424, pushing the reel 424 down within the cassette assembly 104. The leaf spring 428 is compressed by this action and the ribs 427 on the top of the reel 424 are removed from the interference of reel engagement features (not shown) provided on the inside of the upper cassette housing 402. This leaves the reel 424 free to rotate when driven by the motor 322. On disengaging the cassette assembly 104 from the main body assembly 102, the leaf spring 428 pushes the reel 424 upwards against the inside surface of the upper cassette housing 402. This causes the ribs 427 on the reel 424 to engage with the reel engagement features on the inside surface of the upper cassette housing 402, which interfere with the ribs 427 to prevent the reel 424 from rotating. Preventing rotation of the reel 424 when the cassette assembly 104 is disengaged from the main body assembly 102 prevents the line 110 being inadvertently released from the cassette assembly 104 whilst the cassette assembly 104 is being stored or in transit and not attached to the main body 102.

The ribs 427 also act in a manner similar fan blades and, as described above, blow air against the underside of the main body assembly 102. Airflow generated by rotation of the reel 424 blows through the fins of the heatsink 345 which aids in the cooling of the main body assembly 102 (and the components housed therein).

In the present embodiment the sensor assembly 423 is an independent subassembly that is housed in the cassette assembly 104. The sensor assembly 423 includes an encoder wheel 426, low friction bush 457, shaft 459, magnet 462, and cassette controller 422 (including a magnetic encoder chip) which are housed between an upper encoder housing 450 and lower encoder housing 455. As an independent subassembly, the sensor assembly 423 (which is responsible for measuring the length of line played out/retracted during use of the apparatus 100) can be assembled and tested separately to the rest of the cassette assembly 102. Having the sensor assembly 423 as an independent subassembly also allows the critical alignment of the encoder wheel 426 relative to the cassette controller 422 to be maintained whilst at the same time allowing the some movement in the position of the sensor assembly 423 as it is plugged into the main unit 102. This facilitates coupling between the main body assembly 102 and cassette assembly 104. Because the sensor assembly 423 can move within the cassette assembly 104, the communication and power interface in pins on the cassette controller 422 can couple with the connector 335 on the main unit without being placed under stress due to the relative position of the drive spline 330 and teeth 468. This allows minor misalignment to be compensated for which, in turn, provides for greater reliability and better ensures the free running of the encoder wheel 426 and the reel 424.

The encoder wheel 426 has a low friction bush 457 inserted into its base which allows the encoder wheel 426 to rotate freely on a stainless steel shaft 459. Shaft 459 is fixed into the lower encoder housing 455. The diametrically magnetised cylindrical magnet 462 is fitted into the top of the encoder wheel 426, the rotation of which (as the wheel 426 rotates) is monitored by a magnetic encoder chip mounted on the cassette controller 422. The alignment of the magnet 462 to the encoder chip on the cassette controller 422 is important. To facilitate this alignment the cassette controller 422 is reliably located in an upper encoder housing 450 of the encoder assembly 423. The upper and lower encoder housings 450 and 455 are secured together by screws which pass through apertures (obscured) in the lower encoder housing 455 and screw into complementary bores on the upper encoder housing 450. The upper encoder housing 450 also includes a lead sleeve 420 to allow for the easy coupling of the connecting pins on the cassette controller 422 with the mating connector 335 on the main body assembly 102.

In use (and in the present embodiment) the reel 424 carries a length of line 110 wound around the spindle 425 of the reel 424 and which is used to measure the depth of the shaft (or depth/height of the feature of interest). The line 110 may be made from a variety of materials, though advantageously the materials used will provide a low stretch line with high strength, low weight and minimal memory effects. Braided lines of polyethylene, ultra high molecular weight polyethylene, nylon, or similar plastics are suitable, though mono filament lines may also be used provided they exhibit sufficient strength and a resistance to stretching.

In use, the stepper motor 322 is operated by the main body controller 338 to rotate the reel 424 to play out and retract the line 110. The stepper motor 322 has a detent torque which provides a natural brake to the reel 424 and prevents the line 110 and weight 112 from being let out either undesirably or uncontrolledly, whether the stepper motor 322 is energised or not. This is useful when the line 110 is being played out to take a measurement, as the line 110, float 114, and weight 112 do not free-fall but are rather driven by the motor 322.

Further, the main body controller 338 can operate the stepper motor 322 to actively brake the reel 424 (and hence movement of the line 110). This provides a stable lock to the reel which can be engaged very quickly and dynamically. Locking the reel 424 allows a user of the depth determination apparatus 100 to move the depth determination apparatus 100 without the line 110 slipping. This can be useful if the user wishes to dip or otherwise manipulate the leader 108 whilst the line 110 is extended in order to feel for the position of the extended line or adjust the position of the leader 108 within the shaft being measured. The reel 424, is locked by the stepper motor 322 being energised in a fixed position.

Figure 7:
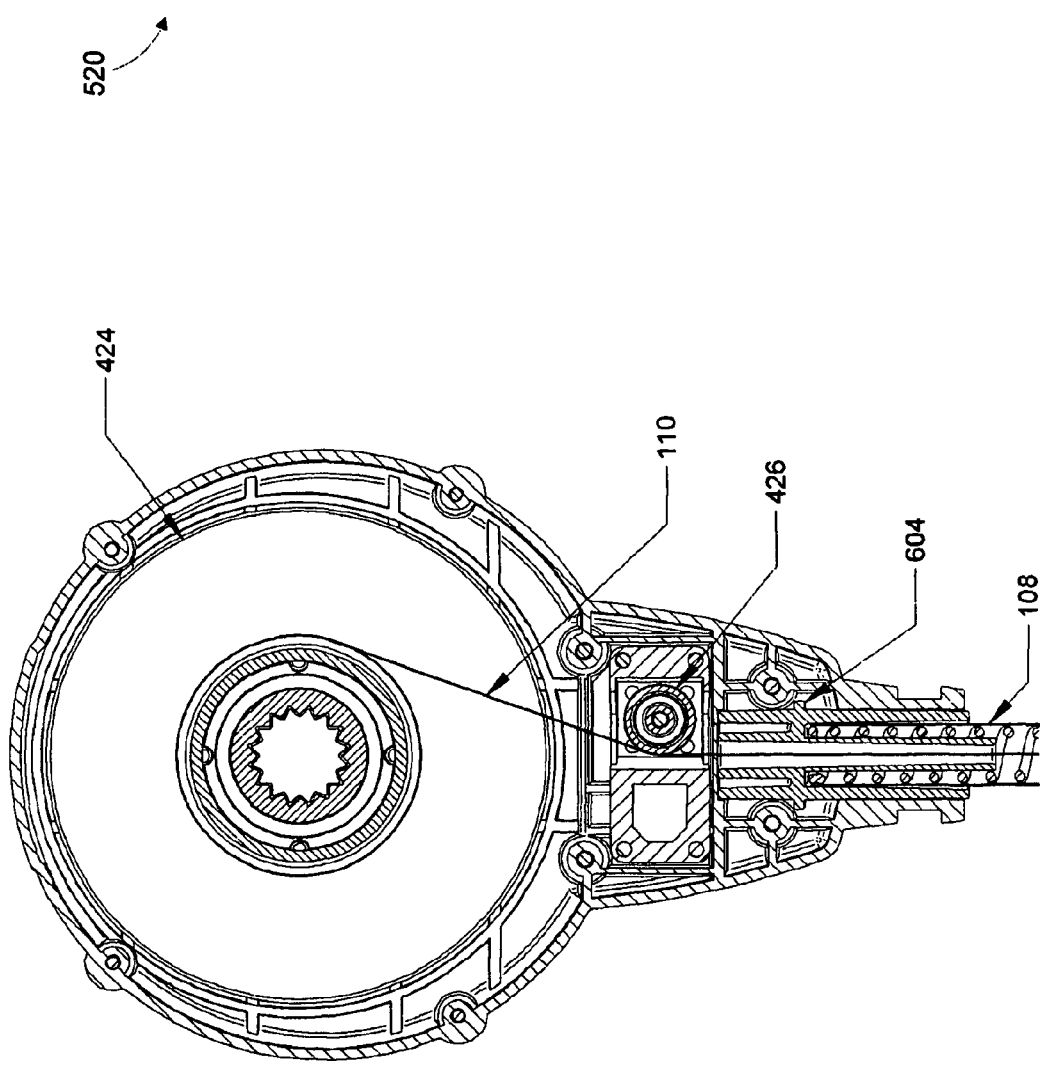
FIG. 7 shows a sectional plan view of the cassette assembly of the apparatus depicted in FIG. 1, the section taken along line A-A of FIG. 1C.

As can be seen in FIG. 7, the line 110 travels from the reel 424 to an internal mouth 604 of the leader assembly 108 via the encoder wheel 426, and travels through the leader assembly 108 to exit the cassette assembly 104. The line 110 wraps around the encoder wheel 426. As described above, the encoder wheel 426 is rotatably mounted in cassette assembly 104, and when the line 110 is under tension movement of the line results in rotation of the encoder wheel 426 and magnet 462. The magnet 462 is diametrically magnetised (as opposed to axially magnetised) such that the cassette controller 422 (via a magnetic encoder chip) detects the changing magnetic field generated by rotation of the magnet to recognise movement of the encoder wheel 426. By counting rotations and part rotations of the encoder wheel 426 the length of line played out (or retracted) can be calculated.

Alternative means for detecting movement and counting rotations of the encoder wheel 426 are, of course possible. For example, a photo diode based encoder could be used. Use of a magnet encoder system is advantageous, however, in that it is more tolerant to dust and moisture than, for example, a photo diode based encoder would be. The magnetic encoder assembler may also allow for simpler manufacturing and assembly.

Information regarding the movement and number of rotations of the encoder wheel 426 is transmitted to the main body controller 338 which, due to the known diameter of the encoder wheel 426, allows for the length of line played out and/or retracted to be calculated. Alternatively, the cassette controller 422 itself can be configured to calculate the length of line played out/retracted and communicate this to the main body controller 338.

Information relevant to the calibration and wear and tear of the cassette 104 may also be maintained either by the cassette controller 422 (stored in a memory in the cassette 104 and transmitted to the main body controller 338) or by the main body controller 338. This information may include, for example, a cassette identifier (to uniquely identify the cassette), the date of manufacture of the cassette, the length of time the cassette has been used, the cumulative length of line that has been played out, and the number of rotations of the encoder wheel 426. This information can be used to advise a user of the depth determination apparatus 100 (via the display 336 or an alternative output means) either that maintenance of the cassette 104 is due or that the cassette 104 is nearing retirement and should be replaced. Calibration data may include multipliers for the calibration of mm/pulse for the particular encoder and wheel used. This allows different types of reels and encoder wheels to be used without having to change the operating software of the main body assembly 102.

As noted above, the encoder wheel 426 is arranged such that it only rotates when the line 110 is moving and tensioned against the wheel 426 (i.e. when the weight 112 has note come to rest on a solid surface). Accordingly, if the main body controller 338 is operating the stepper motor 322 to rotate the reel 424 but no or little movement of the encoder wheel 426 is being detected, this is interpreted by the main body controller 338 (or, in alternative embodiments, the cassette controller 422) to be the circumstance that the weight 112 has come to rest on a surface (e.g. the bottom of the shaft being measured) and no further line 110 should be released/played out. The main body controller 338 then actively and quickly brakes the reel 424 as described above. This assists in preventing excess line 110 from being played out after the bottom has been reached and substantially reduces the likelihood of an overwind or birds-nesting of the line 110. As will be appreciated, locking of the reel 424 in the present embodiment is achieved without requiring any feedback on the line position. Alternative motor types could be used, however feedback on the line position may be necessary which, in turn, may require a closed loop control. Alternatively a mechanical braking arrangement could be used, though these alternatives may be more complex and costly.

By monitoring the direction in which the encoder is turning and checking this against the direction in which the motor is turning, the device can also detect a line loop over which would cause the line to be pulled into the cassette assembly 104 when it was intended to be played out or vice versa. This could occur, for example, if the line 110 was fouled in the reel 424.

The upper and lower cassette housings 402 and 404 are also, respectively, provided with upper and lower leader openings 434 and 436. When assembled, the leader assembly 108 is be secured in the cassette assembly 104 by being clamped between the upper and lower leader openings 434 and 436 in the cassette assembly 104. In alternative embodiments, the leader 108 may be detachably mounted to the cassette assembly, for example by a threaded mouth and complementary opening in the cassette housings.

The arrangement of the cassette 104 with the reel 424 and encoder wheel 426 is such that the line 110 can break or be cut without necessarily rendering the cassette 104 unusable. For example, if a tangle does occur in the line 110 (beyond the end the leader), or if a portion of the line 110 wears through or is cut, operation can continue by reattaching the weight 112 (or a new weight if the original weight cannot be retrieved) and, if necessary, float assembly 114, to the new end of the line 110 and zeroing the depth determination apparatus 100 (via the user control buttons described above). For example, the reel 424 may be provided with 150 m of line, however the average height/depth being measured may only be 30 m. Even if 30 m of line is cut away, the cassette 104 can still be used (provided, of course, the longest measurement required does not exceed the length of the remaining line).

Figure 5A:
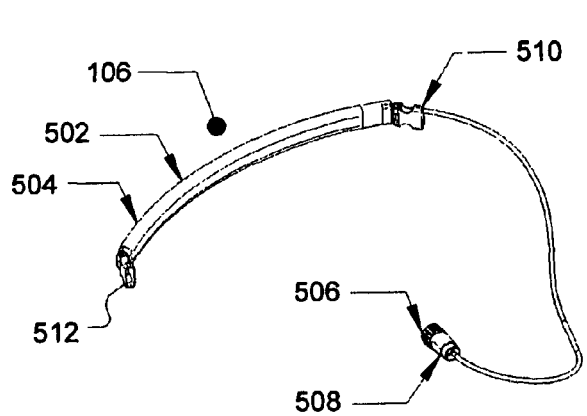
FIG. 5A shows a perspective view of a power supply assembly suitable for use with the apparatus depicted in FIG. 1.

FIG. 5A provides a perspective view of a power supply assembly 106 suitable for use with the depth determination apparatus 100. Power supply assembly 106 includes a portable battery pack 502 which holds one or more batteries 504. In one embodiment the batteries may be rechargeable NiMh batteries, however alternative types could be used as required, such as sealed lead acid for higher loads. The power supply assembly 106 also includes a connector 506 electrically connected to the batteries 504 via an extension piece/lead 508. In the embodiment of FIG. 5A, the power supply assembly 106 is also fitted with clips 510 and 512 which (as can be seen in FIGS. 1 and 2) clip into complementary clips 116 and 118 which, respectively, are attached to straps 120 and 122 which are attached to the main body assembly 102 (via front attachment points 318 and 320 and plate 321). When clipped together, the power supply assembly 106 (and straps 120 and 122) form a shoulder strap 124 (most easily seen in FIG. 1) which provides a user of the apparatus 100 with a means of bearing the weight of the apparatus 100 on their shoulders and reducing the load on their arms. When the depth determination apparatus 100 is assembled, the power supply assembly 106 is connected the main body 102 via connection of the connector 506 with the power supply connector 340 of the main body assembly 102.

Figure 5B:
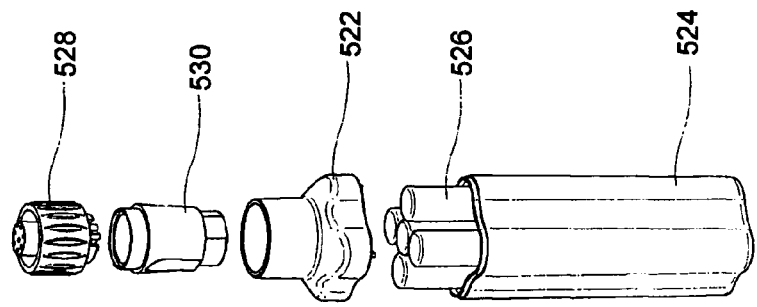
FIG. 5B shows an exploded perspective view of an alternative power supply assembly suitable for use with the apparatus depicted in FIG. 1.

FIG. 5B provides a perspective exploded view of an alternative power supply assembly 520 which is also suitable for use with the depth determination apparatus 100. Power supply assembly 520 is a portable battery pack including upper and lower casings 522 and 524 which secure together to hold, one or more batteries 526. The upper and lower casings 522 and 524 are sealed in a weatherproof configuration to allow use in rugged environments. The power supply assembly 520 also includes a connector 528 electrically connected to the batteries 526 via an extension piece 530. As with the power supply depicted in FIG. 5A, when the depth determination apparatus 100 is assembled, the power supply assembly 520 is connected the main body 102 via connection of the connector 528 with the power supply connector 340 of the main body assembly 102.

In alternative embodiments, an adapter may be provided to allow connection of the depth determination apparatus 100 to an alternative power supply, such as a mains power outlet or a vehicle power outlet (e.g. a cigarette lighter attachment). The adapter may connect to the power supply connector 340 in the main body assembly 102 or to an alternative input provided in the depth determination apparatus 100.

Figure 6:
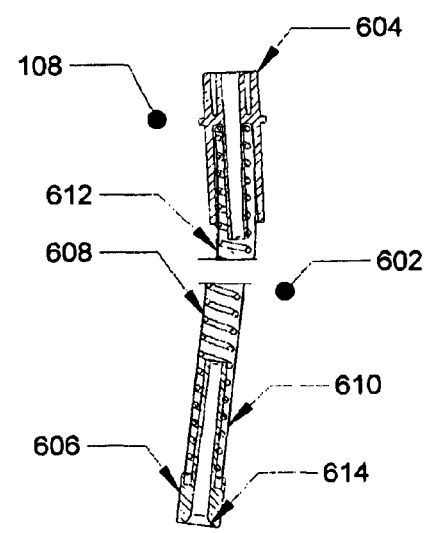
FIG. 6 shows perspective sectional view of a the leader assembly depicted in FIG. 1.

FIG. 6 provides a perspective view of the leader assembly 108 of the present embodiment. Alternative leader assemblies 802 and 850 are described below with reference to FIGS. 8 and 9.

The leader assembly 108 of FIG. 6 is includes an elongate and flexible leader body 602 extending between an internal mouth 604 (insofar as when the depth determination apparatus 100 is assembled the mouth 604 is internal to the cassette assembly) and a distal mouth 606. The leader body 602 is a reinforced sleeve through which the line can be played out and retracted.

The body 602 of the leader 108 is constructed of a relatively wide pitch helical spring 608 covered by a sleeve 610. In this specific embodiment the sleeve 610 is a nylon braided sleeve, the diameter of the spring is 12 mm, and the pitch of the spring is 7.5 mm. The length of the spring 608 can be varied depending on the intended use of the depth determination apparatus 100, but for use in determining the depth of shafts for drill and blasting operations a length of 2 meters may be appropriate. In each mouth 604 and 606 is an insert to the leader 108 which also serves to keep the spring 608 and sleeve 610 of the leader 108 together. The distal mouth 606 has a radius 614 over the lip and a large as possible diameter to allow the line 110 to pass smoothly over the mouth 606. Testing has shown that this assists in minimising drag as the line 110 is played out/retracted.

The body 602 of the leader (e.g. sleeve 610) is provided with one or more markers 612. By aligning a marker 612 with the edge of the feature being measured the length of the leader 108 lying over the edge (e.g. inside the shaft) can be determined, enabling a user to keep a relatively fixed length of the leader 108 over the edge in successive measurements and allowing the depth determination apparatus 100 to be correctly zeroed at each use. The markers 612 may be printed or otherwise marked on the sleeve 610.

The spring and sleeve construction of the body 602 of leader assembly 108 provides for relative movement between the leader assembly 108 and main body/cassette assemblies 102 and 104. This allows the body 602 to be manipulated so that the distal end can be placed in the desired position (the mouth of a shaft or the edge of a building/escarpment etc). The flexible nature of the leader 108 of the present embodiment is such that the line 110 generally exits the leader 108 (through the distal mouth 606) parallel to the sides of the body 602 of the leader. This assists in reducing the likelihood of the line 110 tangling around the leader 108 during retraction.

During retraction, the relative movability of the leader 108 allows for forces generated by the retraction of the line to be absorbed/damped, which reduces the potential for the line 110, float assembly 114 (when used), and weight 112 to fly out of control as it exits the shaft. To further assist in reducing the likelihood of the line 110/weight 112/float assembly 114 flying out of control, the markings 612 on the body of the leader allow a user to ensure that a certain length of the leader 108 is positioned below the edge of the feature being measured.

The sleeve 610 that covers the spring 608 provides a number of useful advantages, including:
- Preventing (or, at the least, reducing the likelihood of) an operator's fingers from coming into contact with the line 110. This is a safety feature as the line may be travelling quite fast;
- Preventing (or, at the least, reducing the likelihood of) operator's fingers from getting pinched between the coils of the spring 608;
- Preventing (or, at the least, reducing the likelihood of) the spring 608 from getting entangled with itself when its coils are looped together;
- Allowing water and fine dust to escape from the leader assembly; and
- Preventing (or, at the least, reducing the likelihood of) rocks and sharp protrusions from penetrating the coils of the spring and damaging the line as it travels through the leader assembly.

As the line 110 and weight 112 (and float assembly 114, if used) are retracted, the coils of the spring 608 provide a reduced, surface area compared, for example, to the surface area if a flat walled tube or similar was used. By reducing the surface area in contact with the line 110 a relatively efficient drive system is provided. Additionally, as the line 110 passes through the spring 608 the line 110 contacts the edges of the spring 608 causing the line 110 to vibrate. This vibration results in a self-cleaning action serving to shake and/or scrape dirt, mud and other foreign matter from the line 110 as it is refracted, reducing the amount of such foreign matter that is drawn into the cassette arrangement 104 and thereby lengthening the life of the cassette arrangement 104. Dirt etc dislodged from the line 110 can either fall out the distal mouth 606 of the leader 108 or, if of sufficiently small particle size, through the pitch of the spring 608 and out of the sleeve 610 which may be porous to allow for this.

The flexibility of the leader 108 allows it to be easily coiled/rolled up into a relatively compact size for the purposes of storage and/or transportation. As the spring 608 does not have a memory it will not retain bends or kinks introduced during rolling. Over short sections (relative to its total length) the spring 608 is relatively stiff and naturally assumes a straight orientation. Over longer lengths, however, the spring 608 is malleable and roughly conforms to the surface over which it is draped—for example mounds of dirt etc near a shaft opening and the edge of the shaft itself. This allows the leader 108 to be draped over the surface and edge of the feature being measured with the end of the leader 108 being essentially straight (vertical).

By providing a leader 108 that this movable relative to the cassette/main body of the depth determination apparatus 100, a user of the depth determination apparatus 100 is provided with a tactile sensitivity to the line 110 during measurement. This sensitivity is important as it allows the user to sense if the line 110, float apparatus 112, and weight 112 have been lowered through water or mud (or similar), at which point the user can stop operation of the motor (via the controls) to take a measurement of the depth the water begins. This is allows a user to measure both the entire depth of the shaft as well as the depth of any water in the shaft as is described in further detail below.

The flexible leader 108 is effective in situations where the user is able to stand fairly close to the edge of the hole and is able to hold the distal end over the edge of the hole easily. In these situations the flexible leader 108 provides the benefits of line protection and self cleaning while providing good feel for the weight at the bottom of the hole.

Where the user is not able to statically position and hold the distal edge of the leader assembly 108 over the edge of the hole, he or she will have to throw the distal end of the flexible leader assembly 108 down the hole. In this case it may be desirable have a portion of the leader assembly 108 near the cassette assembly 104 rigid. Such a rigid section provides a handle to allow the user to easily position the distal end of the leader assembly 108 over the hole. One way of providing such a rigid handle section is, for example, by a removable rigid tube that can be slipped/positioned over the flexible leader assembly 108. This maintains the ability to move the leader assembly 108 independently of the cassette assembly 102, but at the same time provides a means of easily manipulating the distal end of the leader assembly 108 over the hole. By using the rigid tube or similar as a handle, the line 110 can be dipped (e.g. to feel for the presence of water or mud) without having the leader assembly 108 contacting/dragging over the edge of the hole/shaft. It is often desirable to avoid this as it can cause drill tailings (i.e. the dirt that forms a mound around the top of the hole) from being knocked back into the hole, which can be very difficult if not impossible to avoid when using prior art measurement techniques such as a simple tape or similar. An alternative means by which a rigid handle can be provided is described below in relation to FIGS. 9A and 9B.

Figure 8A:
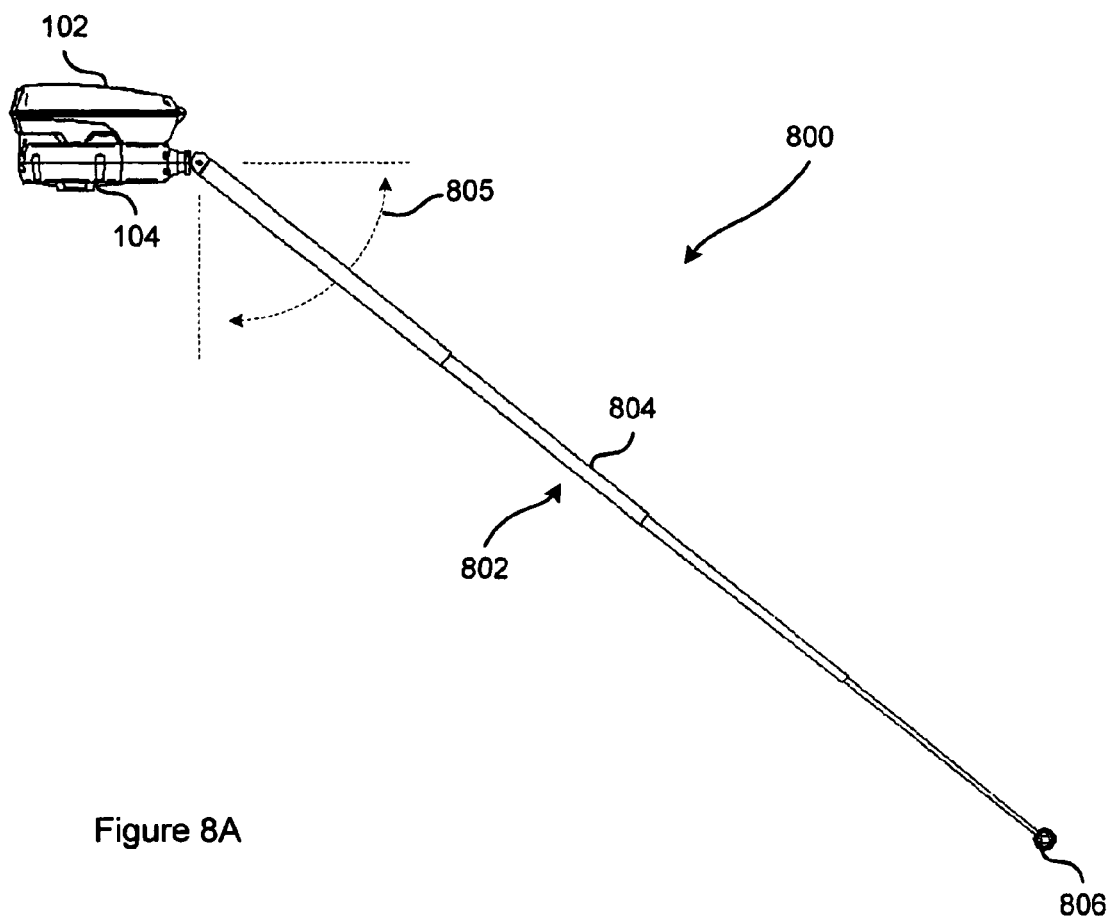
FIG. 8A shows an elevation view of an alternative leader assembly suitable for use with the depth determination apparatus of FIG. 1, the leader assembly being illustrated in an extended configuration.
Figure 8B:
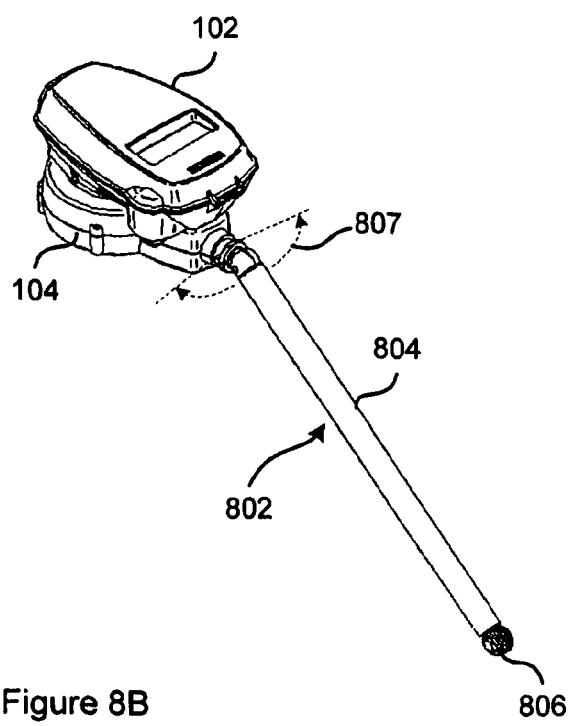
FIG. 8B shows a perspective view of the leader assembly of FIG. 8A in a retracted configuration.

Turning to FIGS. 8A to 8C, an alternative leader assembly 802 suitable for use with the invention will be described. Leader assembly 802 includes a body 804 which is a telescopic rod. In this instance the body 804 includes four telescopic sections and is manufactured from fiberglass. The body 804 is hollow and as with the previous embodiment the depth determination apparatus 800 is configured to play out and retract a line 110, carrying a line weight, through the body 804. In FIG. 8A the body 804 is shown in a fully extended configuration, and in FIG. 8B the body 804 is shown in a fully retracted configuration. The telescopic body 804 allows for the distance between the distal end of the leader assembly 802 and the cassette assembly 104 (and main body assembly 102) to be adjusted. Put alternatively, the telescopic body 804 allows for the straight-line distance between a user of the depth determination device 800 and the edge of the shaft/feature being measured to be altered.

As can be seen in FIG. 8B (which shows the leader assembly 802 in a retracted configuration), the distal end of the leader assembly 802 is fitted with a guard 806. The guard 806 is, in this instance, is made from plastic and is roughly ball shaped. The guard 806 is provided in order to reduce the chance of injury in the event that someone is poked with the distal end of the leader assembly 802. Guard 806 also discourages the line 110 from tangling around the end of the leader assembly 802 when the line (carrying the line weight) is retracted. Alternatively shaped guards 806 could, of course, be provided.

The guard 806 includes a passage through which the line 110 passes, and is provided with a bush (not shown) which assists in guiding the line 110 through the rod and reducing friction between the line 110 and the inside surface of the body 804 (an additional bush is also provided towards the proximate end of the body 817 to further guide the line 110 and reduce friction).

The proximate end of the leader assembly 802 is provided with a joint 808. When the leader assembly 802 is fitted to the cassette assembly 104, joint 808 allows the leader assembly 802 to rotate within the cassette assembly 104 and provides a point of flexure which allows for the angle of the leader assembly 802 relative to the cassette assembly 104 (and other components of the depth determination apparatus 800) to be adjusted. The rotatability and pivotability provided by the joint 808, combined with the telescopic nature of the body 804 of the leader assembly 802, allows the distal end of the leader assembly 802 to be positioned by a user as desired (e.g. at or near the edge of the shaft/feature being measured).

The pivotal movement provided by the joint 808 is restricted to movement through an angle of approximately 90° (as depicted at 805 in FIG. 8A) in order to prevent the line 110 travelling through the 808 from being pinched or otherwise restricted. The rotational movement provided by the joint 808 is restricted to rotation of less than 180° (as depicted at 807 in FIG. 8B) in order to prevent the body 804 from being able to be locked into a horizontal position (i.e. extending directly outwardly from the cassette 104) which could place undue stress on the depth determination apparatus 800 and cause damage.

Joint 808 includes a pair of casings 810, each casing 810 including a semi-tubular portion 812 and a semi-spherical portion 814. Each of the semi-spherical portions 814 is provided with a seat 816. The joint 808 further includes a ball assembly 817 which includes a shaft 818 and ball 820. The shaft 818 is provided with a flange 822 and a pair of shoulders 824 located on either side of the shaft 818. The ball 820 is provided with a pair of lugs 826. The ball assembly 817 includes a passageway 819 through which, when the depth determination apparatus 800 is assembled, the line 100 passes.

The casings 810 and ball assembly 817 may be manufactured from any suitable material, for example by, injection moulding of a plastics material such as ABS or polycarbonate.

To assemble leader assembly 802, the semi-spherical portions 814 of the casings 810 are arranged to encase the ball 820 of the ball assembly 817, with the lugs 826 of the ball 820 locating in the seats 816 of the casings 810. The semi-tubular portions 812 of the casings 810 are then secured inside the body 804 of the leader assembly 802 using, for example, a suitable adhesive. The lugs 826 and seats 816 are, shaped to allow restricted pivotal movement of the body 804 of the leader assembly 802 relative to the ball assembly 817 (and, consequently, the cassette 104), in this instance through an angle of approximately 90 degrees. This allows a user of the depth determination apparatus 600 to pivot the body 804 of the leader assembly 802 between a position where the body 804 is relatively horizontal to the cassette 104 and a position where the body 804 hangs downwardly relative to the cassette 104.

As noted above, restricting the pivotal range of movement of the body 804 prevents the passageway 819 through the ball assembly 817 from being obstructed by the walls of the casings 810. This, in turn, prevents the line 110 from being pinched within the joint 808.

In order to mount the leader assembly 802 to the cassette assembly 104, the shaft 818 of the ball assembly 817 is rotatably mounted between the upper and lower leader openings 434 and 436 of the cassette assembly 104. When assembled, the shaft 818 of the ball assembly 817 is rotatable within the upper and lower leader cassette housings 402 and 404 to allow the direction of the leader assembly 802 to be adjusted. Rotation of the shaft 818 is restricted to less than 180° by shoulders 824, which bear against appropriately placed stops in the upper and lower leader cassette housings 402 and 404. As noted, the restriction of the rotational movement of the leader assembly 102 prevents the body 804 from being able to be locked into a horizontal position.

By way of a further alternative, and with reference to FIGS. 9A and 9B, a leader assembly 850 could be provided with both a proximate rigid section 852 (e.g. a hollow tube or, if desired, an extendable/collapsible section similar to that used in leader assembly 802 described above) and a distal flexible section 854 (e.g. a covered spring type assembly similar to leader assembly 108 described above).

In FIG. 9A the proximate rigid section 852 is joined directly to the cassette assembly 104 by a ball joint or similar (such as ball joint 808 described above). In the embodiment of FIG. 9B, the proximate rigid section 852 is joined to the cassette assembly 104 via an additional flexible section 856 to provide for easy maneuverability of the collapsible section relative to the cassette assembly 104. The distal end of the rigid section 852 is fitted to the distal flexible section 854. The distal flexible section 854 is relatively short, and assists in ensuring that in use the line 110 falls down vertically away from the rigid section 852 through which the line passes. This provides the benefit of having the line protected till it emerges from the device into the hole whilst at the same time providing the ability to maneuver the leader assembly 850 over the hole from a greater distance away from the hole. This is especially useful for very deep holes where it is difficult or dangerous for the user to approach the edge of the hole. The rigid section 852 provides the benefit of sensitivity to feeling the weight (and, if used, float assembly) at the bottom of the hole when a long leader is required as it prevents the leader 850 from being draped over the ground over a great distance which would make it very difficult to feel the weight.

As noted above, in use the distal end of the leader 108 is positioned over the edge of the shaft (or other feature). This allows for the line 110 to be lowered directly into the shaft, rather than running over the edge which could damage and wear out the line 110 during lowering and retracting. This extends the lifespan of the line 110.

As can be seen in FIG. 10A, the end of the line 110 that is proximate the weight 112 is fitted with a tough plastic sleeve 902. The weight 112 is affixed to the line 110 by looping the line through the hole 904 in the weight and then tying the line 110 back on itself. Sleeve 902 is then passed over the knot so as to abut or sit near the weight 112. The knot is deliberately located approximately 60 mm from the top of the weight 112 so as to provide an obstruction that keeps the plastic sleeve 902 in position just above the weight 112. The sleeve 902 protects the line 110 where it connects to the weight 112, and the knot which would otherwise be susceptible to fraying/unraveling. This has been found to improve the life of the line 110. When the line 110 is retracted, the upper end of the sleeve 902 is drawn into the distal end of the leader assembly 108. On retraction into the leader assembly 108, the increased diameter/rigidity of the sleeve 902 (as opposed to the line 110) acts to dislodge dirt/mud/other foreign matter that may have accumulated in the end of the leader assembly 108. This prevents such dirt etc from accumulating and compromising the operation of the apparatus 100.

With reference to FIGS. 10A to 10C, the float assembly 114 will now be described in greater detail. The float assembly 114 is useful in environments where water/mud is present at the bottom of a shaft/feature being measured, and is therefore an optional accessory to the depth determination apparatus 100.

The float assembly 114 includes a roughly cylindrical-shaped body 906 manufactured from a strong plastics material (e.g. polycarbonate). The body 906 defines a passage 908 through which the line 110 passes and, in the present embodiment, is hollow and defines a chamber 910. The bottom of the float 114 is provided with a plurality of holes 912 (in this instance four) which are drilled through the wall of the body 906. An upper section of the body 906 is provided with a bleed hole 914 (again, drilled through the body 906).

In use, when the line 110 hits water the float 114 remains on top of the water while the weight 112 continues to carry the line 110 through the float 114 and to the bottom of the water. The holes 912 in the bottom of the float assembly 114 admit water into the chamber 910, which increases the mass of the float assembly 114. As water is admitted, air is displaced from the chamber 910 and escapes the chamber 910 through bleed hole 914. The bleed hole 914 is located below the very top of the chamber 910 so as to prevent the float 114 from being completely filled with water, which could cause the float 114 to sink.

FIG. 10C depicts the float 114 with the chamber 910 partially filled with water 916 (to the level of the bleed hole 914), and having a bubble of air 918. When partially filled with water as illustrated, the effective mass of the float 114 increases quite substantially without the float 114 sinking. On retraction of the line 110 and weight 112 (once the bottom of the shaft has been detected), the weight 112 will (at the surface level of the water) strike the partially filled float 114.

The striking of the float 114 by the weight 112 at the surface of the water provides clear indication as to the depth at which the water exists.

One indication provided is in the form of a loud sound like a bell made by the striking of the float 114 by the weight 112. Additionally, once the weight 112 has contacted the float 114 there is a very clear difference in the feel of the line 112 due to the weight of the partially filled float 114. Further, the striking of the partially filled float 114 often results in the stepper motor 322 stopping due to the sudden and relatively large change in the load being pulled by the motor 322 at speed. This results in slippage in the driving of the stepper motor 322, causing the motor 322 to stall (providing a slip-clutch type behaviour). This, in turn, causes the apparatus 100 to turn off the motor as it registers that the line 110 is not being retracted though power is being supplied to the motor 322.

Even if the stepper motor 322 is not tripped by the heavy state of the float 114, the weight of the partially filled float 114 still provides a clear sense of load transition to the user at the surface of the water. This can easily be felt by the user when trying to dip the weight 112 and float 114 near the surface of the water—without having to rely on either the stalling of the motor, the sound of the weight 112 striking the float 114, or the sound of the weight 112/float 114 splashing in the water. Consequently, the surface of the water can be easily detected even in a noisy environment such as when heavy equipment is operating in the vicinity.

Once the weight 112 comes into contact with the float 114, both are retracted from the hole. As the float 114 is raised upwards the water in the chamber 910 drains back out through the holes 912, restoring the weight of the float 114 to its "normal" (and relatively light) weight which does not unnecessarily burden the motor 322. This leads to better battery life and less heat dissipation in the apparatus 100. The stepper motor 322 is, however, able to easily lift the float 114 even when it is filled with water at the lower speeds of the motor 322 (the motor 322 only slipping/stalling when it encounters a step change in the load it is lifting).

In alternative embodiments, the float assembly 114 may be provided with further components in order to perform additional functions. For example, in one embodiment (not illustrated) the body 910 of the float assembly 114 houses a circuit board with a battery powered microcontroller having a wireless communication capacity (e.g. Bluetooth). The circuit board monitors a reed switch which is located at the bottom of the float assembly 114 such that it is activated by a magnet at the top of the weight 112 when the float assembly 114 is near/in contact with the weight 112 (e.g. when the weight 112 and float assembly 114 are being lowered into a shaft or similar). When the weight 112 separates from the float assembly 114 (e.g. when the surface of water is reached), the reed switch opens and this event is registered and logged with a time stamp by the microcontroller in the float 114. When the weight 112 is raised and eventually re-contacts the float assembly 114, the reed switch closes and this event is also logged and time stamped by the microcontroller in the float assembly 114. When the float assembly 114 and weight 112 return to the surface of the shaft, the battery powered microcontroller in the float assembly 114 communicates with the main body controller 338 in the main body assembly 102 and provides the timestamps for the breakaway and rejoining of the weight 112 to the float assembly 114. The main body controller 338 uses these timestamps to determine the depth at which these events occurred. To allow for this calculation to be made, the main body controller 338 takes a timestamp when the apparatus 100 is zeroed at the top of the shaft. Subsequent to this the main body controller 338 is programmed to timestamp (for example) every 10 mm increment in the position of the line 110. This resolution is adjustable. These timestamps are stored in memory in the main body assembly 102 and are used to correlate the depth of logged events from the float assembly 114 microcontroller. In this way measurements can be made by the float microcontroller in the shaft and can be correlated to depth when the float assembly 114 and weight 112 are raised back to the surface.

As will be appreciated, in the embodiment described above the depth of the surface level of the water is determined by the microcontroller in the float 114 and switching of the reed switch. In this instance the float 114 does not require either the bleed hole 914 or water ingress/drain holes 912.

In addition to the attachment points 318 and 320 (and plate 321), the depth determination apparatus 100 may be provided with additional mounting and attachment points. For example, either the main body 102 and/or the cassette 104 may be provided with a threaded bore to allow the depth determination apparatus 100 to be mounted to a tripod. Alternatively, a bracket (or bracket mount) may be provided to allow the depth determination apparatus 100 to be mounted to a vehicle or other structure.

As will be appreciated, the main body controller 338 may be configured to provide a number of useful functions to the depth determination apparatus 100. In addition to the display 336 and the user operable buttons on the decal 314, the main body controller 338 may also be connected to and/or provide for other input/output options. For example, the main body controller 338 may allow for wireless communication with other devices, such as mobile phones, PDA's, laptop computers, desktop computers etc, sensors, satellites etc. This communication may be by any appropriate wireless communication protocol, such as Bluetooth, WiFi, GPRS, infrared etc. The main body controller 338 may also or alternatively allow for wired communication with such other devices, in which case the depth determination apparatus 100 is provided with an appropriate port (e.g. USB, USB2, Firewire, Ethernet etc) which is in communication with the main body controller 338 and allows an appropriate cable to be plugged into the depth determination apparatus 100. This allows data logged by the DDA to be uploaded to external devices for analysis and/or processing. It also allows the software/firmware of the depth determination apparatus 100 to be updated.

The depth determination apparatus 100 may also be adapted/configured to provide additional functionality. By way of one non limiting example, the main body 102 may be provided with a GPS receiver in communication with the main body controller 338. The main body controller 338 can then be configured (via software, hardware, or firmware) to record to the physical location of the feature being measured along with the relevant measurement information such as depth/height, temperatures (discussed below), etc.

In the embodiment described above, the depth determination apparatus 100 has been designed such that the cassette assembly 104 can removed from/attached to the main body 102 as desired. Further, the high wear components of the depth determination apparatus 100 (i.e. the reel, 424, encoder wheel 426, the line 110, and the leader 108) are part of the cassette assembly 104. This allows the cassette assembly 104 to be replaced once it has worn out due to use, without having to replace the main body 102 or the power supply 106. This modular construction also allows different cassette assemblies to be provided for different applications. For example, different cassette assemblies may be provided with longer or shorter lines, longer or shorter leaders, and/or different line sensor arrangements as discussed below.

In addition, cassettes offering additional and/or specialised functionality may also be provided. For example, the line of one type of cassette assembly may be fitted with a weight and/or float assembly including a temperature sensor and wireless transmitter which communicates with the main body controller 338 (either directly, or via an additional transceiver). This allows the temperature at various depths/heights of the feature to be measured, logged, and reported on.

Additional and alternative functionality could, include a barometer, an image sensor/camera, a radiation detector, an accelerometer, a gyroscope. Information from various sensors may, as with the temperature sensor, be transmitted wirelessly to the cassette (and from the cassette to the main body controller 338), or directly to the main body controller 338. The main body controller 338 can be configured to receive and process various sensor measurements either by the original firmware/software, or users may update the firmware/software as additional functionality becomes available.

To use the depth determination device 100, an operator approaches the shaft (or the feature to be measured) with the weight 112 retracted to the tip of the leader 108. The operator tosses the tip of the leader 108 (i.e. the distal mouth 606) down the shaft and positions the leader 108 with its reference mark 612 at the top edge of the shaft. Typically the device is zeroed at this point by operating the enter button 354 as described above (after, of course, switching the apparatus 100 on via the power button 366). The display 336 highlights the current operation and defaults to start at 'zero'. After the enter button 354 is pressed to zero the apparatus 100, the displayed option on the display 336 automatically changes to "measure hole depth" or similar. The operator then operates the feed button 352 which causes the stepper motor 322 to run the line 110 out. The weight 112 pulls the line 110 out as the stepper motor 322 drives out. The encoder wheel 426 rotates while the weight 112 is driven out.

When the weight 112 hits the bottom of the shaft the tension comes off the line 110 which stops the encoder wheel 426 rotating. At this point the controller 338 stops the stepper motor 322. The operator can then choose to try and feed the line out again, in which case the stepper motor 322 ramps up slowly again and the encoder wheel 426 rotates if there is tension on the line. The operator can choose to retract the line at any time by pressing the retract button 350.

The operator may jog the line 110 by holding the leader 108 to get a sense of where the weight 112 is in the shaft. When the operator is satisfied that the weight 112 is at the bottom of the shaft, the enter button 354 is operated to register the depth of the shaft. If the apparatus 100 is communicating with an external device such as a PDA, the depth reading is transmitted at this time.

Depending on the shaft in question, and the configuration of the apparatus 100, the display 336 may then display 'measure water top'. The operator may then retract the line to the surface of the water and again jog the line to find the surface of the water. When he has found the surface of the water, the enter button 354 can be pressed again to record the depth of the surface of the water. The display 336 may then show 'next hole' which allow the operator to indicate to an external device that the operator is now measuring another hole.

If not coupled to an external device, the depth determination apparatus 100 can store the depth measurement with a time stamp and (if being used in conjunction with a GPS) a GPS time stamp. This can later be downloaded to a computer or PDA.

When the line 110 is being played out, the controller 338 is programmed to monitor the rate at which the weight 112 and (if present) float assembly 114 are falling by monitoring the rate at which the encoder wheel 426 is turning. The controller 338 checks this rate against the expected rate at which the line 110 should be being played out based on the speed at which the controller 338 is driving the stepper motor 322. If the rate at which the line 110 is being played out is slower than expected, the controller 338 registers this as an anomaly. Each time such an anomaly is detected, a counter is incremented in software by the controller 338. If the anomaly is not present in the next monitoring cycle, the counter is reset. If more than a specified number of consecutive anomalies is detected, the controller 338 stops the motor 322 and indicates to the user that there is insufficient line tension. This typically indicates that the weight 112 has struck a substantial obstruction or the bottom of the shaft.

In addition, each time an anomaly is detected, the controller 338 slows down the motor 322 by a small, amount. This is done progressively down to a minimum value. If the weight 112 and float 114 fall at a rate less than the maximum rate the controller 338 and there is no anomaly detected in the expected rate of line feed, the controller 338 speeds up the motor 322 by a small amount. It continues to do this if no anomalies are detected up to a maximum speed. This self regulation of the fall speed is useful when the weight 112 is falling through water or mud as it prevents the controller 338 from misjudging the slower fall rate as bottom of the shaft instead of the weight 112 falling through a more viscous medium. It assists in avoiding false detection of the bottom of the shaft bottom or obstructions and frees the operator from having to restart the system unnecessarily, whilst ensuring the weight travels to the bottom of the hole at the fastest rate possible.

If the apparatus 100 is equipped with additional sensors such as the wireless temperature or other end of line sensor, the display 336 will show options to allow the readings to be measured and stored.

The apparatus described above allows for the height or depth of a feature of interest to be accurately measured. As will be appreciated, the term "accurate" is relative and with almost all measurements some level of error will exist. Accordingly, reference to "accurate" measurement or determination should be understood to refer to a relatively high degree of accuracy. The precise degree of accuracy will depend on the materials used and the precision of the construction, however using the apparatus described in detail above an error of +/−0.5% can be achieved and is acceptable for the purposes of blasting operations.

It will be understood that the invention disclosed and defined in this specification extends to all alternative combinations of two or more of the individual features mentioned or evident from the text or drawings. All of these different combinations constitute various alternative aspects of the invention.

The invention claimed is:

1. A depth determination apparatus including:
a rotatable reel for receiving a length of line, a free end of the line being adapted to receive a weight;
a hollow elongate leader assembly through which the line is played out and retracted;
a measuring arrangement for measuring the length of line played out and/or retracted through the hollow elongate leader assembly; and
a drive assembly for at least retracting the line through the hollow elongate leader assembly, and wherein
the measuring arrangement includes a sensor assembly configured to detect rotation of a rotatable encoder wheel, the rotatable encoder wheel being mounted so as to rotate only when the line is played out or retracted under tension provided by the weight.

2. The depth determination apparatus according to claim 1, wherein the hollow elongate leader assembly includes at least one hollow flexible section, the hollow flexible section allowing a distal end of the elongate leader assembly to be maneuvered independently of the rotatable reel.

3. The depth determination apparatus according to claim 2, wherein the hollow flexible section of the hollow elongate leader assembly includes a spring through which the line is played out and retracted.

4. The depth determination apparatus according to claim 3, wherein the spring is covered by a sleeve.

5. The depth determination apparatus according to claim 2, wherein the at least one hollow flexible section is substantially the length of the hollow elongate leader assembly.

6. The depth determination apparatus according to claim 2, wherein the hollow elongate leader assembly further includes a hollow rigid section through which the line is played out and retracted, the rigid section being located between at least one of the at least one hollow flexible sections and the rotatable reel.

7. The depth determination apparatus according to claim 1 further including a main controller, and wherein the sensor assembly is adapted to send a signal representative of the length of line that has been played out and/or retracted under tension to the main controller.

8. The depth determination apparatus according to claim 7, wherein the main controller is adapted to control the drive assembly.

9. The depth determination apparatus according to claim 1, wherein the sensor assembly is configured to count one of individual rotations and part rotations of the encoder wheel.

10. The depth determination apparatus according to claim 1, wherein the encoder wheel carries a magnet which rotates with the encoder wheel, and wherein the sensor assembly detects movement of the encoder wheel by detecting changes in the magnetic field.

11. The depth determination apparatus according to claim 1, wherein the drive assembly includes a stepper motor for rotating the reel to play out and retract the line through the hollow elongate leader assembly.

12. The depth determination apparatus according to claim 1, wherein the rotatable reel is housed in a cassette assembly and the hollow elongate leader assembly is attached to the cassette assembly.

13. The depth determination apparatus according to claim 12, wherein the hollow elongate leader assembly is attached to the cassette assembly at a joint which allows pivotal and/or rotational movement of the hollow elongate leader assembly relative to the cassette assembly.

14. The depth determination apparatus according to claim 1, wherein the line carries a float assembly, the float assembly being movable relative to the line.

15. The depth determination apparatus according to claim 14, wherein the float assembly is adapted to provide audible and/or tactile feedback to allow a water level to be determined.

16. The depth determination apparatus according to claim 14, wherein the float assembly includes a hollow body with one or more water inlet holes and one or more breathe holes, the water inlet and breathe holes to allow the hollow body to partially fill with water.

17. The depth determination apparatus according to claim 14, wherein the float assembly includes a float sensor for detecting when the weight is in close proximity to the float assembly and when the weight is separated from the float assembly.

18. The depth determination apparatus according to claim 15, wherein the float sensor is a reed switch that detects the presence of a magnet on the weight.

19. The depth determination apparatus according to claim 17, wherein the float assembly records a timestamp of when the weight is separated from the float assembly and when the weight re-joins the float assembly.

20. The depth determination apparatus according to claim 1, wherein the depth determination apparatus is powered by a detachable power assembly.

21. A cassette and hollow elongate leader assembly detachably mountable to a drive and control unit, the cassette assembly including:
   a reel rotatably mounted in the cassette assembly and adapted to receive a length of line, a free end of the line adapted to carry a weight;
   a drive coupling adapted to detachably couple to a drive assembly of the drive and control unit, the drive assembly for driving the reel to play out and retract the line through the hollow elongate leader assembly; and
   a measuring arrangement for measuring the length of line played out and/or retracted through the hollow elongate leader assembly the measuring arrangement including a sensor assembly configured to detect rotation of a rotatable encoder wheel, the rotatable encoder wheel being mounted so as to rotate only when the line is played out or retracted under tension provided by the weight.

22. The cassette and hollow elongate leader assembly according to claim 21, wherein the hollow elongate leader assembly includes at least one hollow flexible section, the hollow flexible section allowing a distal end of the elongate leader assembly to be maneuvered independently of the cassette.

23. The cassette and hollow elongate leader assembly according to claim 22, wherein the hollow flexible section of the hollow elongate leader assembly includes a spring through which the line is played out and retracted.

24. The cassette and hollow elongate leader assembly according to claim 23, wherein the spring is covered by a sleeve.

25. The cassette and hollow elongate leader assembly according to claim 21, wherein the at least one hollow flexible section is substantially the length of the hollow elongate leader assembly.

26. The cassette and hollow elongate leader assembly according to claim 21, wherein the hollow elongate leader assembly further includes a hollow rigid section through which the line is played out and retracted, the rigid section being located between at least one of the at least one hollow flexible sections and the cassette.

27. The cassette and hollow elongate leader assembly according to claim 21, wherein the sensor assembly is adapted to transmit a signal representative of the length of line that has been played out and/or retracted under tension.

28. The cassette and hollow elongate leader assembly according to claim 21, wherein the sensor assembly is configured to count one of individual rotations and part rotations of the encoder wheel.

29. The cassette and hollow elongate leader assembly according to claim 21, wherein the encoder wheel carries a magnet which rotates with the encoder wheel, and wherein the sensor assembly detects movement of the encoder wheel by detecting changes in the magnetic field.

30. The cassette and hollow elongate leader assembly according to claim 21, wherein the line carries a float assembly, the float assembly being movable relative to the line.

31. The cassette and hollow elongate leader assembly according to claim 30, wherein the float assembly includes a hollow body with one or more water inlet holes and one or more breathe holes, the water inlet and breathe holes to allow the hollow body to partially fill with water.

\* \* \* \* \*